US012633228B2

(12) United States Patent　　　　　(10) Patent No.:　　US 12,633,228 B2
Hollander et al.　　　　　　　　　　　　(45) Date of Patent:　　*May 19, 2026

(54) ELECTRONIC INFRASTRUCTURE FOR DIGITAL CONTENT DELIVERY AND/OR ONLINE ASSESSMENT MANAGEMENT

(71) Applicant: ARH Technologies, LLC, Clearwater, FL (US)

(72) Inventors: Alan R. Hollander, Clearwater, FL (US); Micky McCuen, Clearwater, FL (US)

(73) Assignee: ARH Technologies LLC, Clearwater, FL (US)

( * ) Notice: Subject to any disclaimer, the term of this patent is extended or adjusted under 35 U.S.C. 154(b) by 27 days.

This patent is subject to a terminal disclaimer.

(21) Appl. No.: 18/637,238

(22) Filed: Apr. 16, 2024

(65) Prior Publication Data

US 2025/0046203 A1　　Feb. 6, 2025

Related U.S. Application Data

(63) Continuation of application No. 16/792,134, filed on Feb. 14, 2020, now Pat. No. 11,990,057.

(51) Int. Cl.
G09B 7/02　　　　(2006.01)
G09B 5/10　　　　(2006.01)

(52) U.S. Cl.
CPC ..................................... G09B 7/02 (2013.01); G09B 5/10 (2013.01)

(58) Field of Classification Search
CPC ..................................... G09B 7/02; G09B 5/10
See application file for complete search history.

(56) References Cited

U.S. PATENT DOCUMENTS

| | | | |
|---|---|---|---|
| 11,135,699 B2 | 10/2021 | Subramaniam | |
| 11,990,057 B2 | 5/2024 | Hollander | |
| 2005/0143976 A1* | 6/2005 | Steniford | G10L 21/0208 |
| | | | 704/E19.002 |
| 2008/0254438 A1 | 10/2008 | Woolf | |
| 2010/0035220 A1 | 2/2010 | Herz | |
| 2011/0076653 A1 | 3/2011 | Culligan | |
| 2011/0117534 A1 | 5/2011 | Berger | |
| 2013/0052628 A1 | 2/2013 | Srinivas | |
| 2013/0339105 A1 | 12/2013 | Russell | |
| 2014/0205990 A1* | 7/2014 | Wellman | G09B 7/00 |
| | | | 434/362 |

(Continued)

FOREIGN PATENT DOCUMENTS

WO　　WO2021163292 A1　　8/2021

OTHER PUBLICATIONS

U.S. Appl. No. 16/792,134: Nonfinal Office Action dated Nov. 1, 2021, 25 pages, Doc 001.

(Continued)

*Primary Examiner* — Eddy Saint-Vil

(57)　　　　　　ABSTRACT

Briefly, example methods, apparatuses, and/or articles of manufacture are disclosed that may be implemented, in whole or in part, using one or more computing devices to facilitate and/or support one or more operations and/or techniques for electronic infrastructure for digital content delivery and/or online assessment management, such as implemented, at least in part, via one or more computing and/or communication networks and/or protocols.

20 Claims, 10 Drawing Sheets

(56) References Cited

U.S. PATENT DOCUMENTS

| | | | | |
|---|---|---|---|---|
| 2014/0272849 A1* | 9/2014 | Bhatia | ...................... | G09B 7/02 |
| | | | | 434/237 |
| 2015/0269244 A1* | 9/2015 | Qamar | .................. | G06Q 10/10 |
| | | | | 705/7.42 |
| 2016/0292645 A1 | 10/2016 | Polli | | |
| 2018/0061259 A1 | 3/2018 | Ng | | |
| 2018/0081914 A1* | 3/2018 | Zoll | .................... | G06F 11/3452 |
| 2019/0026681 A1 | 1/2019 | Polli | | |
| 2019/0196932 A1 | 6/2019 | Adika | | |
| 2019/0362642 A1 | 11/2019 | Dhamecha | | |
| 2020/0218781 A1* | 7/2020 | Takano | ................ | G06Q 30/016 |

OTHER PUBLICATIONS

U.S. Appl. No. 16/792,134: Response to Nonfinal Office Action filed Jan. 31, 2022, 29 pages, Doc 002.

U.S. Appl. No. 16/792,134: Final Office Action dated May 9, 2022, 29 pages, Doc 003.

U.S. Appl. No. 16/792,134: Response to Final Office Action filed Jul. 11, 2022, 30 pages, Doc 004.

U.S. Appl. No. 16/792, 134: Advisory Action dated Jul. 27, 2022, 6 pages, Doc 005.

U.S. Appl. No. 16/792,134: RCE and Amendment filed Sep. 8, 2022, 35 pages, Doc 006.

U.S. Appl. No. 16/792,134: Nonfinal Office Action dated Oct. 5, 2022, 35 pages, Doc 007.

U.S. Appl. No. 16/792,134: Response to Nonfinal Office Action filed Jan. 5, 2023, 31 pages, Doc 008.

U.S. Appl. No. 16/792,134: Final Office Action dated Apr. 12, 2023, 36 pages, Doc 009.

U.S. Appl. No. 16/792,134: Response to Final Office Action filed Jul. 4, 2023, 35 pages, Doc 010.

U.S. Appl. No. 16/792,134: Advisory Action dated Jul. 26, 2023, 4 pages, Doc 011.

U.S. Appl. No. 16/792,134: RCE and Amendment filed Aug. 14, 2023, 39 pages, Doc 012.

U.S. Appl. No. 16/792,134: Nonfinal Office Action dated Aug. 28, 2023, 28 pages, Doc 013.

U.S. Appl. No. 16/792,134: Response to Nonfinal Office Action filed Nov. 28, 2023, 27 pages, Doc 014.

U.S. Appl. No. 16/792,134: Examiner Interview Summary dated Dec. 12, 2023, 2 pages, Doc 015.

U.S. Appl. No. 16/792,134: Supplemental Amendment filed Feb. 21, 2023, 28 pages, Doc 016.

U.S. Appl. No. 16/792,134: Notice of Allowance/Allowability dated Jan. 18, 2024, 9 pages, Doc 017.

U.S. Appl. No. 16/792,134: Issue Fee filed Apr. 16, 2024, 8 pages, Doc 018.

PCT Application No. PCT/US2021/017611: PCT Application filed Feb. 11, 2021, 117 pages, Doc 019.

PCT Application No. PCT/US2021/017611: International Search Report and Written Opinion dated Apr. 16, 2021, 14 pages, Doc 020.

PCT Application No. PCT/US2021/017611: International Preliminary Report on Patentability dated May 11, 2022, 16 pages, Doc 021.

* cited by examiner

400

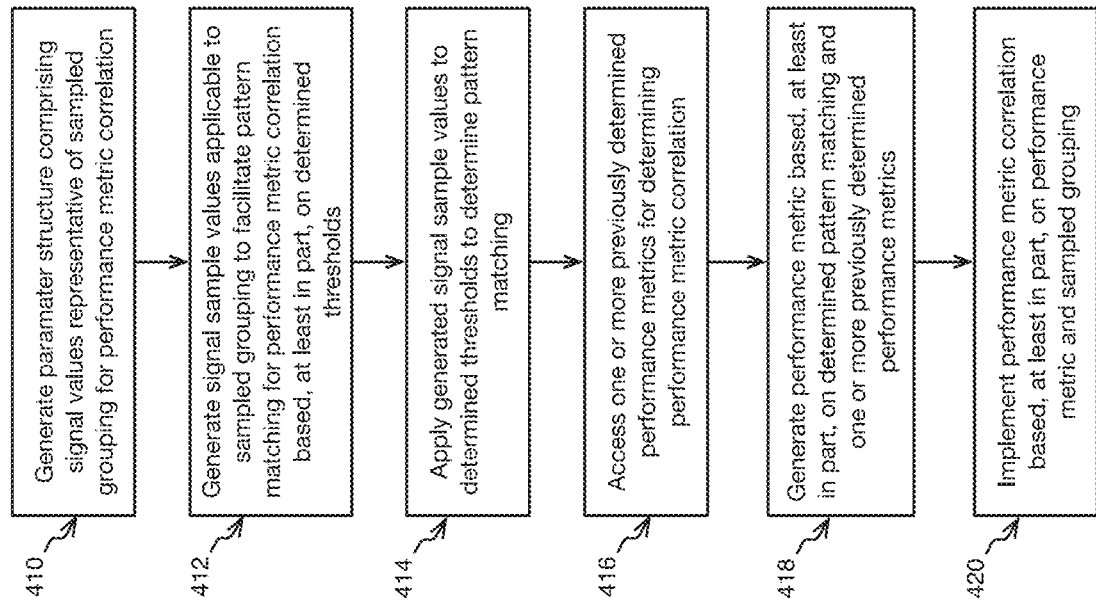

Generate paramater structure comprising signal values representative of sampled grouping for performance metric correlation Generate signal sample values applicable to sampled grouping to facilitate pattern matching for performance metric correlation based, at least in part, on determined thresholds Apply generated signal sample values to determined thresholds to determine pattern matching Access one or more previously determined performance metrics for determining performance metric correlation Generate performance metric based, at least in part, on determined pattern matching and one or more previously determined performance metrics Implement performance metric correlation based, at least in part, on performance metric and sampled grouping 410
412
414
416
418
420

FIG. 4

Determine known performance metrics for sampled grouping — 501

Determine signal sample values for sampled grouping — 502

Determine signal type — 504

Is signal type unrecognized? — 506 yes → Access and display appropriate error message — 508 → Terminate — 530 no → Is signal type image? — 510 yes → Using OCR or other standard, scan image for text — 512 no → Is signal type audiovisual? — 518 yes → Using speech-to-text libraries, scan media for text — 520 no → Is signal type text? — 522 yes → Search for and tag keywords in text buffer — 514 no → goto 508

Search for and tag keywords in text buffer — 514 → Obtain input indicative of sections selected for threshold pattern matching — 516 → Output — 540

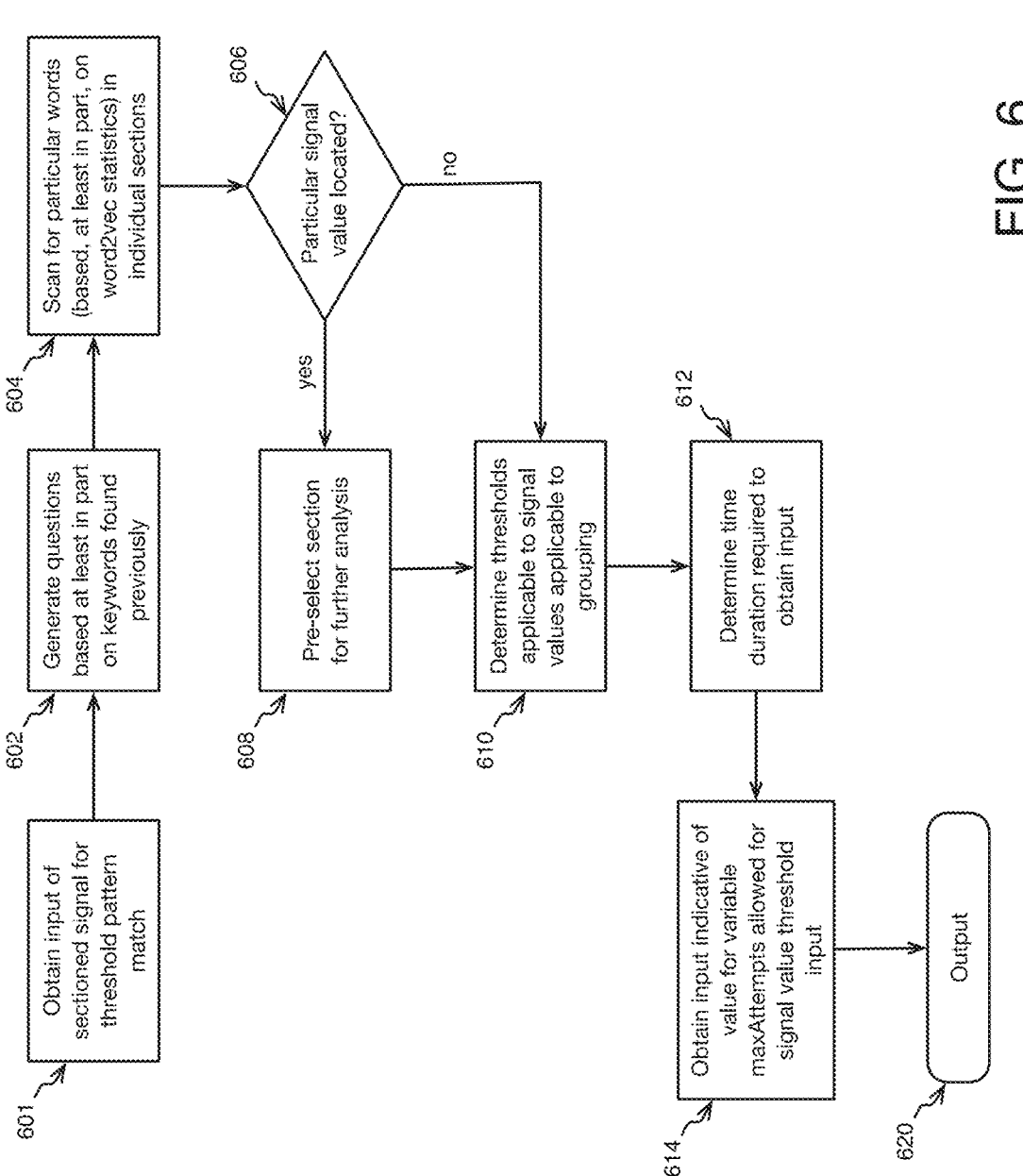

600

601 Obtain input of sectioned signal for threshold pattern match

602 Generate questions based at least in part on keywords found previously

604 Scan for particular words (based, at least in part, on word2vec statistics) in individual sections 606 Particular signal value located?

yes

608 Pre-select section for further analysis no

610 Determine thresholds applicable to signal values applicable to grouping

612 Determine time duration required to obtain input

614 Obtain input indicative of value for variable maxAttempts allowed for signal value threshold input 620 Output

FIG. 6

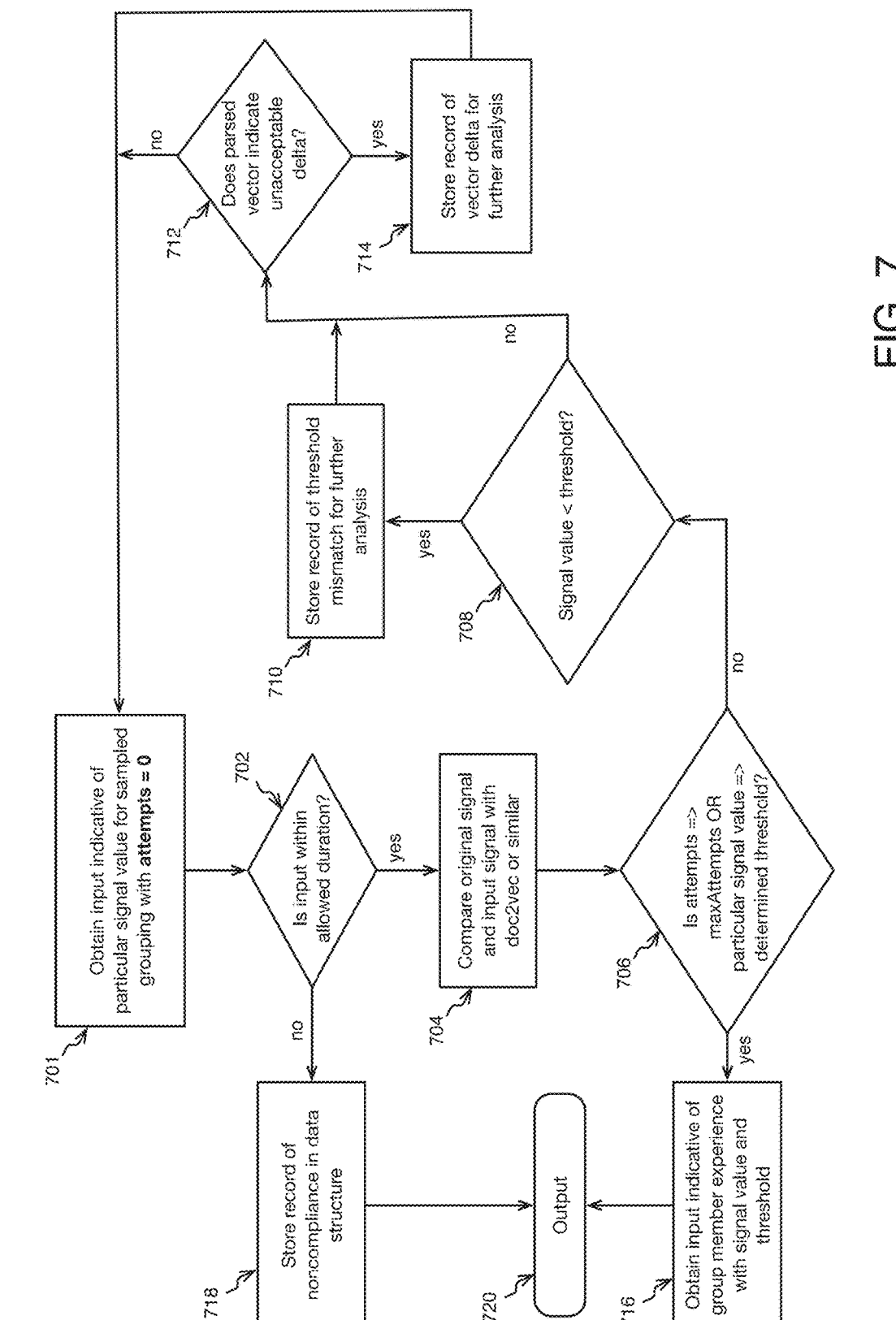

700

701 — Obtain input indicative of particular signal value for sampled grouping with attempts = 0

702 — Is input within allowed duration?

704 — Compare original signal and input signal with doc2vec or similar

706 — Is attempts =≥ maxAttempts OR particular signal value =≥ determined threshold?

708 — Signal value < threshold?

710 — Store record of threshold mismatch for further analysis

712 — Does parsed vector indicate unacceptable delta?

714 — Store record of vector delta for further analysis

716 — Obtain input indicative of group member experience with signal value and threshold 718 — Store record of non-compliance in data structure 720 — Output

FIG. 7

ELECTRONIC INFRASTRUCTURE FOR DIGITAL CONTENT DELIVERY AND/OR ONLINE ASSESSMENT MANAGEMENT

This application is a continuation of U.S. patent application Ser. No. 16/792,134, entitled "Electronic Infrastructure for Digital Content Delivery and/or Online Assessment Management," filed Feb. 14, 2020, incorporated herein by reference in its entirety.

BACKGROUND

1. Field

The present disclosure relates generally to electronic or computing infrastructures or environments and, more particularly, to electronic infrastructure that may be used, in whole or in part, to facilitate and/or support digital content delivery and/or online assessment management, such as implemented, in whole or in part, via one or more computing and/or communication networks and/or protocols.

2. Information

Today's computing and/or network systems allow for relatively large amounts of digital content, such as content describing, for example, electronic files, computer-readable instructions, directives, policies, etc., to be stored, processed, communicated, etc. across relatively large enterprises. Further, online content continues to increase. Highly specialized tools, such as individualized and/or tailored assessment and/or diagnostic tools, for example, may be needed to facilitate digital content management. Managing digital content throughout relatively large enterprises, for example, may pose significant networking and/or communication challenges.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIG. 4 is a flow diagram depicting yet another example process for digital content delivery and/or online assessment management, in accordance with an embodiment.

FIG. 5 is a flow diagram depicting an example process for generating parameter structures, in accordance with an embodiment.

FIG. 6 is a flow diagram depicting an example process for generating signal sample values applicable to sampled groupings to facilitate pattern matching, in accordance with an embodiment.

FIG. 7 is a flow diagram depicting an example process for pattern matching, in accordance with an embodiment.

Figure 1:
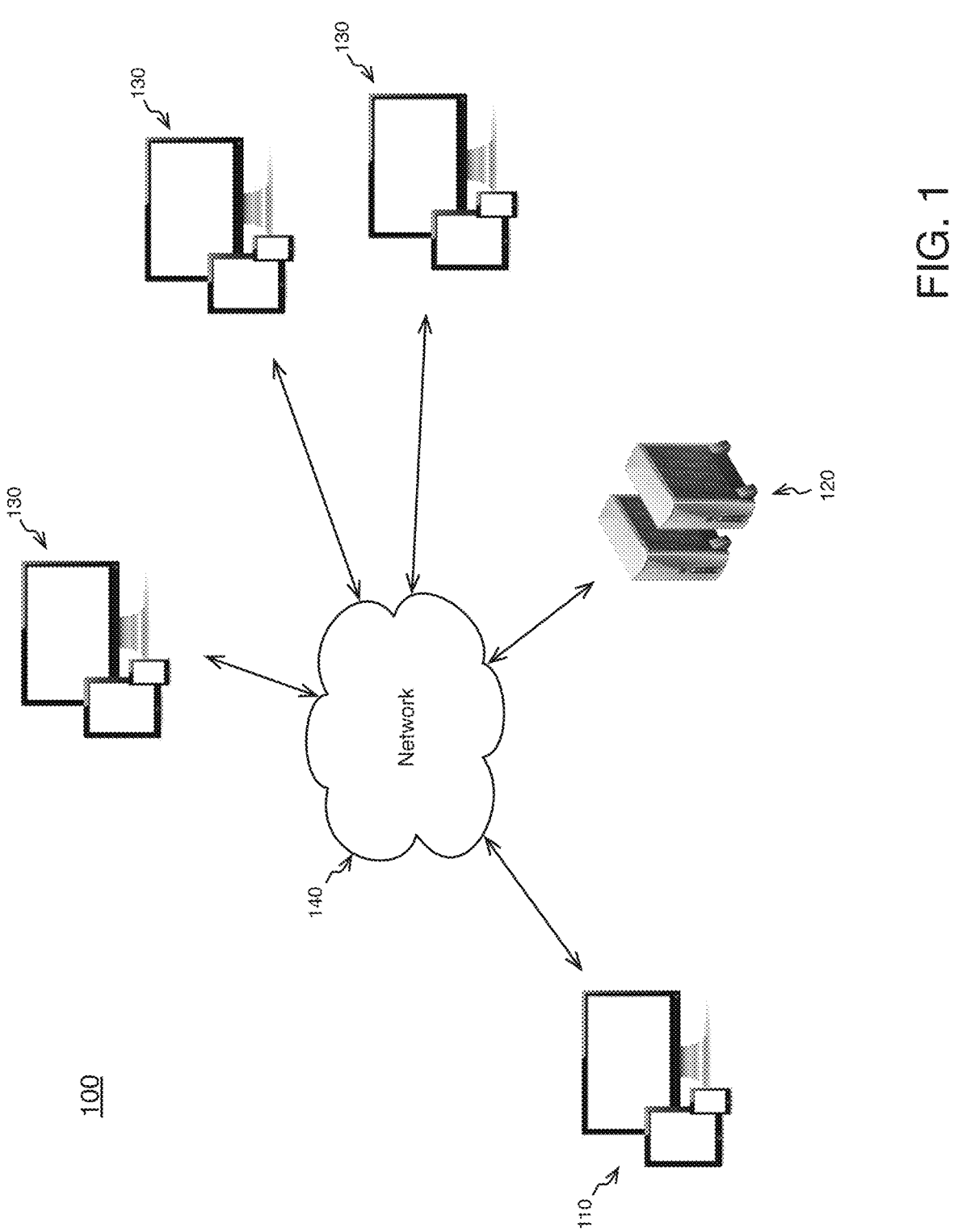
FIG. 1 is a schematic diagram illustrating an example computing network, in accordance with an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc. may be omitted, such as for ease of discussion, or the like. Further, it is to be understood that other embodiments may be utilize, in whole or in part. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

Today's computing and/or network systems allow for relatively large amounts of digital content, such as content describing, for example, electronic files, computer-readable instructions, directives, policies, etc., to be stored, processed, communicated, etc. across relatively large enterprises. Further, online content continues to increase. Highly specialized tools, such as individualized and/or tailored assessment and/or diagnostic tools, for example, may be needed to facilitate digital content management. Managing digital content throughout relatively large enterprises, for example, may pose significant networking and/or communication challenges.

For example, in some instances, challenges may be faced with respect to electronic assembly of particular digital content and/or electronic delivery of such digital content, such as both to and from particular entities, which may include, for example, computing devices associated with organizational units, online users, etc. (e.g., for assessment or like purposes, etc.). At times, challenges may also be faced with respect to maintaining and/or managing digital records of these or like processes (e.g., for performance correlation assessment, skill gap improvement, etc.).

In some instances, to help address these or like challenges, an electronic infrastructure for digital content delivery, which may include instructional delivery, for example, and/or online assessment management may prove to be beneficial. For example, as discussed in greater detail below, in an embodiment, a system, device and/or process may be implemented, in whole or in part, wherein a parameter structure comprising signal sample values pertaining to a sampled grouping may be generated. As will also be seen, at times, signal sample values applicable to the sampled grouping may, for example, be generated to facilitate a pattern matching based, at least in part, on one or more thresholds determined for the sampled grouping. Further, in an embodiment, a system, device and/or process may be implemented, in whole or in part, wherein the generated signal sample values may be applied to the one or more determined thresholds for determining the pattern matching based, at least in part, on the generated parameter structure. For example, in an implementation, a pattern matching may be indicative, at least in part, of how well a sampled grouping performed responsive to disseminated digital content. In some instances, ensuring statistically significant or otherwise sufficient degree of online performance may, for example, be correlated with or indicative of improved comprehension and/or retention of disseminated digital content, which, in turn, may lead to improved implementation of particular instructions, directives, policies, etc., for example, which may lead to improved performance for particular entities (e.g., businesses, organizations, associations, governments, etc.).

For example, as explained more fully below, pattern matching to indicate, at least in part, how well a sampled grouping performed responsive to disseminated digital content may have a wide applicability. For example, this or like pattern matching may be applied via one or more communications and/or computing protocols to determine a likelihood of increased sales due to newly developed system and/or process, lower risk to the company (e.g., improved compliance with sexual harassment policy) and/or a stronger team of employees (e.g., due at least in part to a greater portion of the employees operating in a relatively uniform fashion). In an implementation, one or more software and/or firmware agents may be implemented, in whole or in part, to adapt one or more computing devices (e.g., mobile devices, tablet devices, laptop computing devices, desktop computing devices, server computing devices, etc.) to assemble digital content (e.g., digital content representative of one or more instructions, directives and/or policies), to initiate delivery of digital content to a particular grouping (e.g., one or more user computing devices associated or co-located with one or more online users, etc.) and/or to obtain digital assessment values from a particular grouping, such as to determine one or more parameters indicative of metrics related to how well a sampled grouping performed responsive to disseminated digital content.

As further discussed below, in an implementation, one or more software and/or firmware agents may adapt one or more computing devices to obtain, generate and/or track one or more parameters indicative of metrics that may indicate whether digital assessment values obtained from a sampled grouping indicate, at least in part, how well the sampled grouping performed responsive to disseminated digital content. In some instances, a statistically significant or otherwise sufficient degree of online performance may, for example, be correlated with or indicative of a particular level of retention of disseminated digital content. For example, in an implementation, one or more software and/or firmware agents may adapt one or more computing devices to obtain, generate and/or track one or more parameters indicative of metrics that may indicate whether input obtained from one or more computing devices is indicative of a particular degree of compliance with one or more particular instructions, procedures and/or policies communicated via particular disseminated digital content. Further, in an implementation, parameters indicative of metrices obtained, generated and/or tracked via one or more computing devices may be utilized, in whole or in part, to generate values indicative of predicted probabilities and/or improvements. For example, this computing approach may be widely applied, such as, for example, to generate values indicative of predicted probabilities and/or improvements related to one or more aspects of a sampled grouping's performance including, for example, sales numbers for one or more particular departments of a larger business entity. Also, for example, these or like parameters indicative of metrics may be stored as digital signals and/or may be further processed, such as to determine statistical correlations for a variety of uses, such as, for example, related to retention and/or implementation of disseminated instructions, directives and/or policies. Further, these or like parameters indicative of metrics may be stored as digital signals and/or may be further processed in connection with performance reviews, promotions, etc. and/or to review and/or edit particular policies and/or procedures to better fit a particular organization's needs and/or goals, for example.

An embodiment may comprise an at least partially autonomous software and/or firmware agent implemented, in whole or in part, to adapt one or more computing devices within enterprise computing networks of various sizes to electronically track and/or generate parameters indicative of predicted probabilities or confidence values that may be utilized, in whole or in part, to estimate or evaluate how well a sampled grouping performed responsive to disseminated digital content. In some instances, for example, a statistically significant or otherwise sufficient degree of online performance may be correlated with and/or may be indicative of a particular degree of understanding, retention and/or implementation of specific instructions, directives, procedures, policies, etc. that may be disseminated across a statistical and/or sampled population of online users, for example. Implementations may be advantageously scaled to be utilized, in whole or in part, in connection with entities ranging from merely a few computing devices to many thousands of computing devices, for example.

FIG. 1 is a schematic diagram illustrating an embodiment 100 of an example operating environment capable of facilitating and/or supporting one or more operations and/or techniques for digital content delivery, which may include instructional delivery, for example, and/or online assessment management. In an implementation, operating environment 100 may include one or more computing devices 110 that may be utilized, in whole or in part, by administrative personnel, for example. For example, computing network 100 may be implemented, in whole or in part, at a particular company having a number of directors, managers, supervisors, etc., and/or having a number of other employees. As mentioned, embodiments may be implemented, in whole or in part, in connection with entities of varying sizes ranging from relatively few computing devices to many thousands of computing devices. In an implementation, computing device(s) 110 may be utilized, in whole or in part, by company directors, managers, supervisors, for example. Further, computing devices 130 may be utilized, in whole or in part, by rank-and-file employees, for example.

In an implementation, computing devices 110 and/or 130 may comprise IoT-type devices, although claimed subject matter is not limited in scope in this respect. In this context, "IoT-type devices" refer to one or more electronic or computing devices capable of leveraging existing Internet or like infrastructure as part of the so-called "Internet of Things" (IoT), such as via a variety of applicable protocols, domains, applications, etc. IoT may comprise a system of interconnected and/or internetworked physical devices in which computing is embedded into hardware so as to facilitate and/or support devices' ability to acquire, collect, and/or communicate content over one or more communications networks, for example, at times, without human participation and/or interaction. IoT-type devices may include a wide variety of stationary and/or mobile devices, such as, for example, automobile sensors, biochip transponders, heart monitoring implants, kitchen appliances, locks or like fastening devices, solar panel arrays, home gateways, smart gauges, smart telephones, cellular telephones, security cameras, wearable devices, thermostats, Global Positioning System (GPS) transceivers, personal digital assistants (PDAs), virtual assistants, laptop computers, personal entertainment systems, tablet personal computers (PCs), PCs, personal audio or video devices, personal navigation devices, or the like. Typically, in this context, a "mobile device" refers to an electronic or computing device that may from time to time have a position or location that changes, and a "stationary device" refers to a device that may have a position or location that generally does not change. In some instances, IoT-type devices may be capable of being identified, such as uniquely, via an assigned Internet Protocol (IP) address, as one particular example, and/or having the ability to communicate, such as receive and/or transmit electronic content, for example, over one or more wired and/or wireless communications networks.

In an implementation, server computing device(s) 120 may comprise any suitable servers or combination thereof capable of facilitating and/or supporting one or more operations and/or techniques discussed herein. For example, server(s) 120 may comprise one or more content servers, simulation servers, update servers, back-end servers, management servers, archive servers, location servers, positioning assistance servers, navigation servers, map servers, crowdsourcing servers, network-related servers, or the like.

It should be appreciated that operating environment 100 is described herein as a non-limiting example that may be implemented, in whole or in part, in the context of various wired or wireless communications networks, or any suitable portion and/or combination of such networks. For example, communication network 140 may comprise one or more public networks (e.g., the Internet, the World Wide Web), private networks (e.g., intranets), wireless wide area networks (WWAN), wireless local area networks (WLAN, etc.), wireless personal area networks (WPAN), telephone networks, cable television networks, Internet access networks, fiber-optic communication networks, waveguide communication networks, or the like. It should also be noted that claimed subject matter is not limited to a particular network and/or operating environment. Thus, depending on an implementation, one or more operations and/or techniques for digital content delivery, which may include instructional delivery, for example, and/or online assessment management. For example, in an implementation, a pattern matching may be indicative, at least in part, of how well a sampled grouping performed responsive to disseminated digital content. In some instances, ensuring statistically significant or otherwise sufficient degree of online performance may, for example, be correlated with or indicative of improved understanding, retention and/or implementation of instructions, directives and/or policies that may be disseminated via digital content across a population of users in an indoor environment, an outdoor environment, or any combination thereof.

Even though a certain number of computing platforms and/or devices are illustrated herein, any number of suitable computing platforms and/or devices may be implemented, in whole or in part, to facilitate and/or support one or more techniques and/or processes associated with operating environment 100. For example, at times, network 140 may be coupled to one or more wired and/or wireless communication networks (e.g., WLAN, etc.) so as to enhance a coverage area for communications with one or more computing devices 110, one or more computing devices 130, server(s) 120, and/or the like. In some instances, network 122 may facilitate and/or support femtocell-based operative regions of coverage, for example. Again, these are merely example implementations, and claimed subject matter is not limited in this regard.

Figure 2:
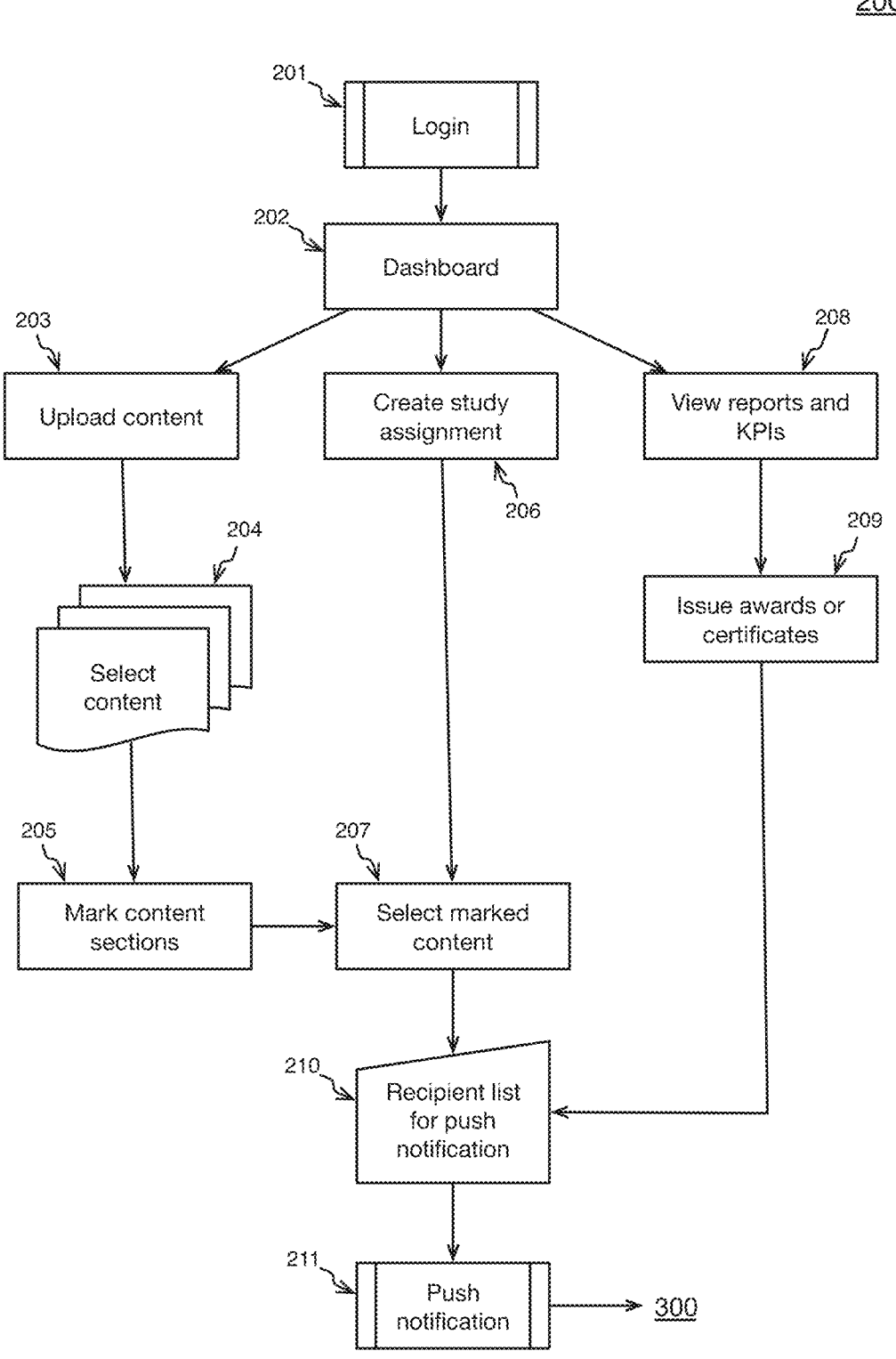
FIG. 2 is a schematic block diagram depicting an example process for digital content delivery and/or online assessment management, in accordance with an embodiment.

FIG. 2 is a schematic block diagram depicting an embodiment 200 of an example process for digital content delivery, which may include instructional delivery, for example, and/or online assessment management, as explained more fully below. It should be noted that digital content acquired or produced, such as, for example, input signals, output signals, operations, results, etc. associated with example process 200 may be represented via one or more digital signals. It should also be appreciated that even though one or more operations are illustrated or described concurrently or with respect to a certain sequence, other sequences or concurrent operations may be employed. In addition, although the description below references one or more particular aspects and/or features illustrated in certain other figures, one or more operations may be performed with other aspects and/or features. In general, example process 200 may be implemented, in whole or in part, as a software and/or firmware agent including computer-readable code that, when executed by a computing device, such as computing device 110, facilitates generating, tracking and/or predicting parameters indicative of metrics indicative of how well a sampled grouping performed responsive to disseminated digital content. In some instances, ensuring statistically significant or otherwise sufficient degree of online performance may, for example, be correlated with or indicative of improved understanding, retention and/or implementation of instructions, directives and/or policies that may be disseminated via digital content across a population of users. For ease of discussion, a software and/or firmware agent executed by a computing device, such as computing device 110, to facilitate generating, tracking and/or predicting parameters indicative of metrics indicative of how well a sampled grouping performed responsive to disseminated digital content, for example, may be referred to as an "instructional delivery and/or online assessment management application" (IDOAM application). As explained more fully below, in some instances, an IDOAM application may be partitioned between computing devices 110 and computing devices 130, in an implementation. In another implementation, a particular version of an IDOAM application may be provided for supervisory personnel, for example, and another particular version of an IDOAM application may be provided for other users, for example. Example process 200 generally pertains to a an IDOAM application or portion of an IDOAM application executed at computing device 110 for use by supervisory personnel, for example. In an implementation, computing device 110 may comprise a desktop computing device, a notebook computing device or a tablet device, to name but a few non-limiting examples.

In an implementation, an IDOAM application may support different roles and/or contexts for different users. For example, an IDOAM application may provide attributes, settings, privileges, etc. that may be set on a per-user basis. As explained more fully below, individual users may be designated as participating in one or more roles and/or contexts, such as a supervisory role, a query-creator role and/or a student role, for example, as further discussed below. In an implementation, a designation of "supervisor" may allow a particular user to access aspects of an IDOAM application suitable for a supervisory role, including example aspects described herein (e.g., controlling access to particular digital content and/or particular comprehension verification assignments for subordinate users). Similarly, for example, a designation of "query-creator" may allow a particular user to access aspects of an IDOAM application suitable for a query-creator role, including example aspects described herein. A designation of "student," for example, may allow a particular user access to particular aspects of an IDOAM application suitable for a student role, including examples described herein (e.g., access to particular digital content and/or comprehension verification assignments specified by a supervisor). Further, in an implementation, a particular user may be designated as participating in multiple roles and/or contexts. For example, a particular user may be designated as both a supervisor and student, or supervisor and query-creator or supervisor, query-creator and student, with particular roles depending, at least in part, on particular contexts, as more fully described below.

In an example situation, a supervisor at a particular company may wish to disseminate, via an electronic process, digital content (e.g., digital content representative of a new and/or revised policy, procedure or instruction) to computing devices accessible to and/or associated with a specified group of employees which may include one or more particular subsets of employees (e.g., one or more employees) or the entire company. Further, at times, for this example, a supervisor may have prepared, via an electronic process, digital content to be disseminated to computing devices accessible to and/or associated with the specified group of employees. Although particular examples described herein may involve a company, claimed subject matter is not limited in this respect. For example, particular implementations may be utilized, in whole or in part, in connection with any of a wide range of organizations and/or associations. Similarly, although some users are described as "employees" in some examples, claimed subject matter is not limited in this respect.

As depicted at block 201, a user, such as a supervisor, may provide input to a computing device. For example, a user may, via a computing device, login to an IDOAM application executed by computing device 110. For example, the supervisor may be prompted via a graphical user interface to enter login credentials (e.g., user name and password, biometric indicator, etc.) via a keyboard, pointing device, touch screen, fingerprint reader, camera (e.g., facial recognition) and/or the like. In an implementation, an IDOAM application may, via an electronic process, process parameters representative of one or more attributes, permissions and/or privileges, for example, to determine one or more specified roles for a particular user. For the current example, a user may be designated via an electronic process as a "supervisor," and that designation may specify to an IDOAM application to provide access for the particular user to aspects of an IDOAM application suitable for a supervisor role. As further indicated at block 202, an IDOAM application may cause digital content representative of a dashboard display to appear via a graphical user interface. In an implementation, a dashboard may provide a means by which a supervisor (e.g., a user assigned to a supervisor role with respect to one or more specified users assigned to a student role within an IDOAM application) may upload digital content to be disseminated to computing devices associated with a specified group of employees, as depicted at block 203. Also, in an implementation, a dashboard display may also allow the supervisor, for example, to view digital content, such as, for example, parameters representative of various reports and/or key performance indicators (KPI), discussed more fully below, as indicated at block 208. Further, as depicted at block 209, a dashboard display may enable the supervisor to issue, via an electronic process, awards and/or certificates to particular employees and/or groups of employees, for example.

As mentioned, a user, such as the supervisor for the present example, may upload, via an electron process, digital content to be disseminated to computing devices accessible to and/or associated with a specified group of users, such as employees, as depicted at block 203. In an implementation, the supervisor may upload digital content, such as the electronic document prepared by the supervisor, to computing device 110 by way of a graphical user interface and/or one or more input devices under the control of an IDOAM application executed by computing device 110. In an implementation, an IDOAM application may obtain input from a user, such as a supervisor, indicative of particular portions of uploaded and/or stored digital content for dissemination to computing devices accessible to and/or associated with a specified group of users, as indicated at block 204. Further, as indicated at block 205, an IDOAM application may, via an electronic process, mark or otherwise partition uploaded digital content into particular numbered sections, for example.

In an implementation, an IDOAM application may, via an electronic process, obtain parameters representative of input from a user, such as the supervisor for the present example, and in response the IDOAM application may generate parameters representative of a comprehension verification assignment, as indicated at block 206. For example, the supervisor may wish that a particular group of employees receive training on a particular revised policy. In an implementation, the supervisor may be presented parameters representative of one or more queries via a dashboard of an IDOAM application executed by computing device 110. For example, the supervisor may be asked via a graphical user interface "What are the most important points of this policy that you wish to have employees understand and apply?" In response, for example, the supervisor may provide input, via an electronic process, to the IDOAM application to identify parameters representative of one or more particular passages within particular digital content that contains the revised policy.

Further, an IDOAM application may, via an electronic process, pose one or more other queries, such as "How would you be able to observe whether or not this policy is being used by an employee?" Again, a user, such as the supervisor for the present example, may provide, via an electronic process, an appropriate assessment value (e.g., values indicative of an answer to a query). Based at least in part on the response provided by the supervisor, for example, the IDOAM application may generate parameters representative of a series of prompts that may allow the supervisor to relatively quickly specify relatively simple queries and/or quizzes to be pushed out to computing devices accessible to and/or associated with the specified group of employees (e.g., those who have been assigned to read the material at issue) as part of a comprehension verification assignment. As utilized herein, "comprehension verification assignment" refers to one or more queries that may be posed to one or more users to verify, at least in part, comprehension by the one or more users of particular aspects of particular digital content. At times, a comprehension verification assignment may be referred to as a "quiz." In an implementation, an IDOAM application may provide, via an electronic process, sample queries, such as true/false queries and/or multiple-choice queries. Thus, in an implementation, an IDOAM application, such as may be executed at computing device 110, may guide a user, such as the supervisor for the present example, in specifying parameters representative of a series of queries, to be generated by the IDOAM application, designed to test how well a sampled grouping performs responsive to the digital content (e.g., digital content representative of one or more instructions, directives and/or policies) to be disseminated.

In an implementation, a number of queries to be generated may depend, at least in part, on a length and/or size of a particular digital content at issue. For example, a relatively smaller electronic document may result in generation of relatively few queries (e.g., one or two queries) and a relatively larger electronic document may result in generation of relatively greater number of queries. In an implementation, one query may be generated for every two pages of text up to ten pages, one query for every three pages up to twenty pages, etc., although claimed subject matter is not limited in these respects.

As indicated at block 207, an IDOAM application may, via an electronic process, associate a series of generated queries to particular and/or appropriate sections of digital content previously marked at operation 205. Further, as depicted at block 210, a user, such as the supervisor, may indicate, via an electronic process, computing devices accessible to and/or associated with particular users (e.g., employees) to receive a push notification comprising the digital content to be disseminated, parameters representative of the generated queries, etc. As mentioned, particular subsets of employees may be selected (e.g., selected individuals, particular departments, etc.) and/or the entire company may be selected. In an implementation, an IDOAM application may push, via an electronic process, signals representative of the particular digital content and/or generated queries, for example, to computing devices accessible to and/or associated with the selected employees, as indicated at block 311.

Figure 3:
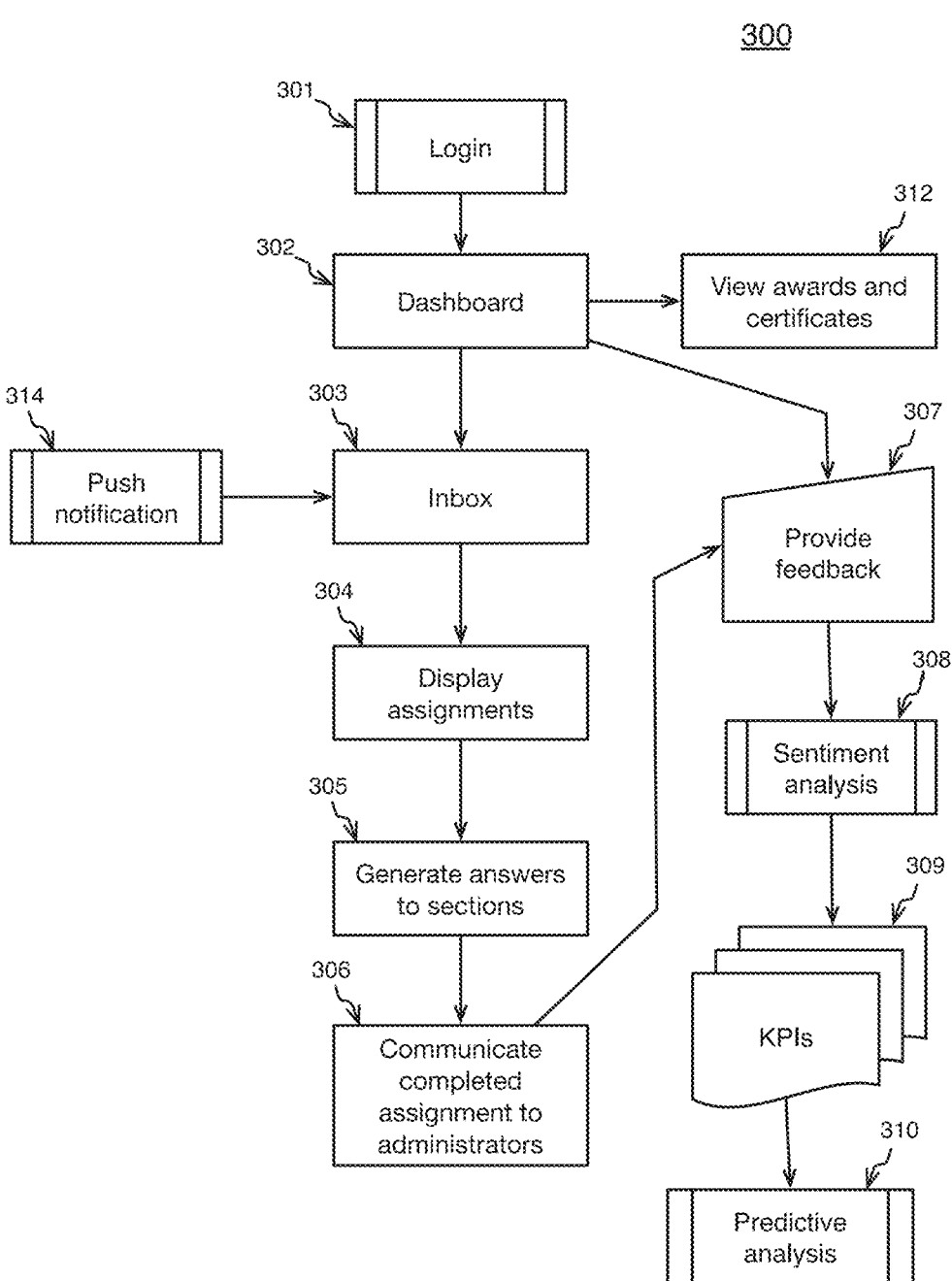
FIG. 3 is a schematic block diagram depicting another example process for digital content delivery and/or online assessment management, in accordance with an embodiment.

FIG. 3 is a schematic block diagram depicting an embodiment 300 of example process for digital content delivery, which may include instructional delivery, for example, and/ or online assessment management, as explained more fully below. It should be noted that content acquired or produced, such as, for example, input signals, output signals, operations, results, etc. associated with example process 300 may be represented via one or more digital signals. It should also be appreciated that even though one or more operations are illustrated or described concurrently or with respect to a certain sequence, other sequences or concurrent operations may be employed. In addition, although the description below references one or more particular aspects and/or features illustrated in certain other figures, one or more operations may be performed with other aspects and/or features. In general, example process 300 may be implemented, in whole or in part, as a software and/or firmware agent including computer-readable code that, when executed by a computing device, such as computing device 130, facilitates, at least in part, instructional delivery and/or online assessment management. As mentioned, an IDOAM application may be partitioned between computing devices 110 and computing devices 130, in an implementation. As also mentioned, separate versions of an IDOAM application may be provided for supervisory personnel and/or for other users. Example process 300 generally pertains to an IDOAM application or a portion of an IDOAM application executed at computing device(s) 130 for utilization by a non-supervisor user (e.g., employee) operating in a student role and/or context, in an implementation.

Continuing with the example situation in which a supervisor at a particular company wishes to disseminate particular digital content (e.g., digital content representative of a new and/or revised policy, procedure or instruction) to computing devices accessible to and/or associated with a specified group of employees, for example, the employees may have installed on one or more electronic devices, such as computing devices 130, an IDOAM application that may allow the employees to obtain and/or consume, via an electronic process, digital content pushed to their electronic devices. As depicted at block 301, a user, such as an employee, may login to an IDOAM application executed by computing device 130. For example, the employee may be prompted via a graphical user interface to enter login credentials (e.g., user name and password, fingerprints, facial features, etc.) via a touch display, voice command, fingerprint reader, camera and/or the like. As further indicated at block 302, an IDOAM application may generate and/or otherwise process parameters representative of a dashboard that may be displayed at computing device 130, for example. In an implementation, an IDOAM application dashboard may provide a means by which an employee may interact, via an electronic process, with digital content pushed to computing device 130 from a supervisor's computing device 110, for example. Also, in an implementation, an IDOAM application dashboard may also allow an employee, for example, to view, via an electronic process, awards and/or certificates, for example, that may be designated for the particular employee, as explained more fully below. Further, as depicted at block 307, a dashboard display may enable an employee, for example, to provide feedback related to one or more supervisors, for example.

As indicated at blocks 314 and 303, digital content pushed to computing device 130 may be stored as signals and/or states in a parameter structure representative of an inbox within a memory of computing device 130. For example, signals and/or states representative of digital content and/or queries pushed to an employee's computing device 130 at operation 211 of FIG. 2, described above, for example, may be received at computing device 130 at operation 314 of FIG. 3 and/or may be stored in a particular parameter structure within a memory of computing device 130. In an implementation, a notification may appear on a display of computing device 130 to alert the employee of a pushed IDOAM message.

In an implementation, a user, such as an employee, for example, may respond to an IDOAM application notification via a graphical user interface of computing device 130. For example, an employee may tap on and/or otherwise select a particular badge appearing on a display of computing device 130 and/or may tap on and/or otherwise select a line item appearing in an inbox or elsewhere within an IDOAM application, such as an IDOAM application dashboard 302. At least in part in response to an appearance a notification of an IDOAM message, an employee may open, via an electronic process, an IDOAM application on computing device 130, in an implementation. Further, in an implementation, an IDOAM application may orient the employee with respect to the subject matter associated with the notification. For example, a visual and/or audible message may indicate "You have recently received a company policy that . . . " or "Have you read this policy?" or "Have you watched this video?" and/or the like. Of course, claimed subject matter is not limited in scope to these particular messages or message types. At least in part in response to perceiving such a message, an employee may respond, via an IDOAM application dashboard, for example, in a manner to indicate whether or not the digital content at issue has been consumed. At least in part in response to an employee indicating, via an electronic process, that the pushed digital content has not yet been consumed by the employee, an IDOAM application may display a reminder to the employee to have the employee consume the digital content by a particular date and/or time, for example.

Further, at least in response to an IDOAM application notification, an IDOAM application may provide to an employee, via a graphical user interface, for example, an option to select a "Read now" and/or "Watch now" button, for example. As mentioned, an employee may access content pushed to computing device 130 via an inbox. In an implementation, an IDOAM application may generate a text message or other reminder of a pending assignment if the user does not respond to an IDOAM application notification, such as by opening an IDOAM application and/or by accessing pushed digital content, for example, to a particular notification within a specified amount of time. In an implementation, a period of time for a response may be selectable (e.g., 24 hours, 48 hours, etc.), via an electronic process, by a supervisor, for example.

Also, in an implementation, a user failing to respond, via an electronic process, to a notification within a specified period of time may receive, by way of a graphical user interface, an autonomously-generated final notice and/or may be provided with a specified period of time in which to respond. A failure to respond within the final time period may trigger a report of non-compliance that may be communicated from computing device 130 to computing device 110, for example, to alert an administrator of the non-compliance. In an implementation, a report of non-compliance may be automatically communicated to computing devices accessible to and/or associated with the employee, to the employee's immediate supervisor and/or to a human resources department, for example. Such communication may occur electronically. For example, a company may maintain a database of employee files, wherein signals and/or states representative of various parameters related to individual employees may be stored. In an implementation, an electronic report of non-compliance may be automatically stored, via an electronic process, in an employee's electronic personnel file at least in part in response to a failure to respond to an alert within the prescribed period of time.

Further, in an implementation, a user, such as an employee, may view assignments, such as particular content to consume and/or queries to answer, via an IDOAM application executed at computing device 130, as indicated at block 304. An IDOAM application may also provide an employee the means to provide inputs representative of digital assessment values (e.g., answers) to queries posed regarding particular sections of the digital content being consumed, as indicated at block 305, for example. In an implementation, at least in part in response to a determination that an employee has consumed the pushed digital content, an IDOAM application may invite the employee to answer one or more queries related to the pushed digital content. For example, an IDOAM application may display a message such as "Please take a moment to answer the following queries" and/or the like. An employee may be directed to a spot check and/or comprehension verification assignment area of an IDOAM application, for example, and/or may be asked one or more queries. In an implementation, one or more queries pertaining to pushed digital content may be posed to an employee. For example, queries generated at least in part at operation 206 of example process 200, described above, may be posed to an employee via an IDOAM application executed at computing device 130, in an implementation.

At least in part in response to having answered the queries correctly, an IDOAM application executed at computing device 130, for example, may communicate a message via a graphical user interface thanking the employee for their participation. Further, an employee's responses to posed queries may be recorded, such as stored as signals and/or states in a memory of a computing device, such as computing device 110 and/or computing device 130, for example. Digital content, such as signals and/or states representative of answered queries for individual employees and/or for groups of employees from across a company, may be gathered via an electronic process over a period of time. Such content may be analyzed and/or may be otherwise utilized, in whole or in part, to generate reports that may be communicated to a human resources department and/or to other supervisory and/or administrative personnel, for example, as depicted at block 306. As discussed more fully below, such content may be analyzed via an electronic process to determine one or more parameters representative of metrics related to how well a sampled grouping performed responsive to disseminated digital content. In some instances, for example, parameters representative of metrics related to how well a sampled grouping performed responsive to disseminated digital content may be processed to predict, at least in part, one or more parameters indicative of one or more aspects of a company's performance, in an implementation.

In an implementation, an IDOAM application may facilitate, via an electronic process, at least in part, an awards program wherein those who answer queries correctly (e.g., provides input indicative of correct digital assessment values) over a specified period of time may receive points towards a periodic (e.g., quarterly, annually, etc.) bonus. In an implementation, rewarding performance by a sampled grouping responsive to dissemination of digital content may strengthen a main purpose of a system, device and/or process for digital content delivery and/or online assessment management, for example. In an implementation, a rewards system may be optionally setup by an administrator via dashboard 202 of example process 200.

Returning to operation 305 of example process 300, if an employee provides an input, via an electronic process, representative of an incorrect assessment value, for example, an IDOAM application executed at computing device 130 may display via a graphical user interface an indication of an incorrect assessment value to the employee and/or may display one or more relevant portions of pushed digital content to the employee. An employee may re-read displayed portions of pushed digital content, for example, and an IDOAM application may again pose, via an electronic process, one or more queries to the employee, for example. A selectable (e.g., by a supervisor) number of iterations of queries and answers may be executed until an employee successfully provides input indicative of correct digital assessment values for each query successfully. Additional opportunities to consume (e.g., read) the pushed digital content may be provided. For example, an employee may be given instructions by an IDOAM application via a graphical user interface to re-consume pushed digital content by a particular time and/or date at which time the employee may again provide, via an electronic process, input representative of answers to generated queries. As mentioned, an employee's responses to posed queries, for example, may be recorded, such as stored as signals and/or states in a memory of computing device 110 and/or 130, for example. Digital content (e.g., signals and/or states) representative of digital assessment values for particular queries for individual employees and/or for groups of employees, for example, from across a company may be gathered over a period of time, as was mentioned. Such content may be analyzed and/or may be otherwise processed, in whole or in part, to generate parameters representative of reports that may be communicated to computing devices accessible to and/or associated with a human resources department and/or to other supervisory and/or administrative personnel, for example, as depicted at block 306.

In an implementation, an IDOAM application may facilitate electronic processes that may present objective content representative of cause and effect relationships between employee performance, for example, responsive to disseminated digital content (e.g., performance with respect to understanding, retention and/or implementation of particular policies, procedures and/or instructions) and particular aspects of employee job performance. For example, as employee histories are created and/or as more and more parameters indicative of metrics are gathered and/or analyzed, an IDOAM application may provide even greater benefits and/or advantages. For example, in groups where employees perform correctly (e.g., within acceptable boundaries) responsive to disseminated digital content, employee performance and/or productivity, for example, may be enhanced. In an implementation, by tracking and/or analyzing parameters indicative of metrics gathered via an IDOAM application, management, administrative and/or supervisory personnel may have access to unbiased parameters representative of metrics that may be processed, in whole or in part, to evaluate reliability, competence and/or future outcomes of particular employees, groups of employees, departments, and/or an entire company, for example. Additionally, at times, for example, parameters indicative of metrics gathered and/or analyzed via an IDOAM application, such as example implementations described herein, may help identify which aspects of disseminated digital content (e.g., policies, procedures and/or instructions or portions of policies, procedures and/or instructions) may not be implemented correctly (e.g., within suitable limits) so that corrective action (e.g., additional and/or focused training, adjustment of policy, procedure and/or instruction, etc.) can be taken.

Returning again to example process 300, digital content indicative of completed assignments (e.g., parameters indicative of particular pushed digital content, queries, answers, etc.) may also be provided to example operation 307 wherein feedback may be obtained, via an electronic process. For example, feedback may comprise parameters provided by a user, such as an employee, via an IDOAM application dashboard and/or may comprise digital content indicative of completed assignments. In an implementation, an IDOAM application may also perform, via an electronic process, sentiment analysis, such as indicated at block 308, may generate and/or modify parameters representative of KPIs as indicated at block 309, and/or may perform predictive analysis functions as depicted at block 310, for example. Further explanation with respect to feedback, sentiment analysis, KPIs, and predictive analysis is provided below.

FIGS. 4-9, discussed below, depict example processes for digital content delivery, which may include instructional delivery, for example, and/or online assessment management. In general, example processes 400, 500, 600, 700, 800, and/or 900 pertain to an example learning retention (IDOAM) software and/or firmware application comprising computer-readable code executable by one or more computing devices, such as computing devices 110 and/or 130, for example. In one or more implementations, an IDOAM application may comprise an at least partially autonomous software and/or firmware agent implemented, in whole or in part, to adapt one or more computing devices, such as computing device(s) 110 and/or 130, within enterprise computing networks of various sizes to initiate delivery of digital content to particular groupings and/or to obtain digital assessment values from particular groupings, such as to determine one or more parameters indicative of metrics related to how well particular groupings retained and/or implemented, in whole or in part, disseminated digital content.

As more fully explained below, an example system, device and/or process for digital content delivery, for example, may be implemented, in whole or in part, in a single and/or distributed server system. Further, as explained more fully below, an example system, device and/or process may store sets of parameters comprising one or more lists of users grouped into one or more organizational units and/or sub-units. Records for individual users may include parameters indicative of one or more supervisors assigned to an individual user and/or may also include parameters representative of other specified attributes, such as how to notify a particular user of new assignments, for example. Also, parameter structures for individual organizational units and/or sub-units may include parameters representative of one or more individuals charged with leadership of the unit and/or sub-unit and/or representative of one or more individuals who are to be notified of non-compliance events.

In an implementation, as more fully described below, an example system, device and/or process may store digital content comprising policies, bulletins, videos and/or any of a wide range of informational and/or instructional content. In an implementation, such digital content may be maintained as a list, for example, in a parameter structure stored in a memory of one or more computing devices, such as computing device(s) 110, 120 and/or 130, for example. In an implementation, a parameter structure may store digital content comprising policies, bulletins, videos and/or any of a wide range of informational and/or instructional content, for example, and/or may store links to digital content stored elsewhere. In an implementation, at least some digital content may be partitioned via an electronic process into particular sections that may be individually assigned for dissemination and/or verification, for example. Also, in an implementation, a new record within a parameter structure may be allocated for newly revised electronic documents and/or other digital content such that a versioned history may be maintained. In an implementation, as more fully explained below, individual items and/or sections of digital content may be associated with one or more multiple-choice and/or true/false-type queries, for example, that may be at least substantially randomly selected for use as a comprehension verification assignment depending at least in part on user preference for a particular item and/or section of digital content.

In an implementation, as mentioned herein, setup of records of digital content may be accomplished via a software and/or firmware agent, such as an IDOAM application. User-specified intervals for reminders and/or periodic verification, for example, may also be set via an IDOAM application. In an implementation, comprehension verification assignments may include as few as a single query or may be more exhaustive depending at least in part on particular subject matter and/or based at least in part on selections made by a particular user setting up a particular record, for example.

Also, in an implementation, an example system, device and/or process may maintain records, such as sets of parameters stored in a memory of computing device(s) 110, 120 and/or 130, for example, identifying particular digital content items assigned to particular users. Such records may indicate, for example, whether a user has consumed (e.g., read) the particular digital content item and/or may indicate a time and/or date by which the particular digital content item is to be consumed. In an implementation, digital content may be assigned to users individually and/or as part of an organizational unit. Further, in an implementation, digital content may also be retroactively assigned (e.g., by a user with suitable privileges) as "studied" to indicate that it has already been consumed. For example, a supervisor may be familiar with particular digital content (e.g., prior to upload), and may not need to study it further before being quizzed on the content as part of a comprehension verification assignment. Thus, the particular digital content for the particular supervisor may be designated within an IDOAM application as "studied," for example. Further, in a particular implementation, particular digital content for particular students may be designated, via an electronic process, as "studied" in response to particular students passing an appropriate comprehension verification assignment. Further, for example, a designation of "never studied" may also be indicated with an IDOAM application, in an implementation. As mentioned, an example IDOAM application may remind a user at specified intervals, via an electronic process, to consume particular digital content and/or to participate in a comprehension verification assignment for particular digital content.

In an implementation, if a particular digital content item is updated prior to being studied by a particular user, an individual performing the update may select, via an electronic process, whether to update any non-completed assignments related to the particular digital content, reassign the newly revised version of the particular digital content item to users that previously completed assignments related to a previous version of the particular digital content item and/or leave previous assignments "as-is."

In an implementation, once a particular user has studied a particular digital content item, the particular user may be asked by an IDOAM application, via an electronic process and/or via a graphical user interface, to perform a comprehension verification assignment. Individual users may select, via an electronic process, a particular means of notification via user-selectable settings within an IDOAM application executed, for example, on a user's personal computing device, such as computing device 130. Further, in an implementation, once notified of a comprehension verification assignment, a user may have a specified amount of time in which to complete the assignment via an IDOAM application executed on a user's computing device, such as computing device 130. As was mentioned, failure to respond to a notice within specified periods of time may result in a report of non-compliance being electronically generated and/or communicated to a user's supervisor and/or any other individuals tasked with monitoring compliance for a particular organizational unit.

FIG. 4 is a flow diagram depicting an embodiment 400 of an example process for digital content delivery, which may include instructional delivery, for example, and/or online assessment management. It should be noted that content acquired or produced, such as, for example, input signals, output signals, operations, results, etc. associated with example process 400 may be represented via one or more digital signals. It should also be appreciated that even though one or more operations are illustrated or described concurrently or with respect to a certain sequence, other sequences or concurrent operations may be employed. In addition, although the description below references one or more particular aspects and/or features illustrated in certain other figures, one or more operations may be performed with other aspects and/or features. As indicate generally at operation 410, a parameter structure comprising signal values representative of one or more sample groupings may be generated for performance metric correlation, for example.

As indicated at operation 412, for example, signal sample values applicable to one or more sampled groupings may be generated to facilitate pattern matching for performance metric correlation based, at least in part, on determined thresholds. For example, an IDOAM application may be installed and/or may be initialized, such as upon being opened and/or launched at a computing device, such as computing device 110. In an implementation, an IDOAM application may include parameter structures that may be utilized, in whole or in part, to create user interface prompts, for example. Such parameter structures may be populated with specified values, at least in part, by an administrator and/or manager, in an implementation. For example, historical content pertaining to one or more users (e.g., employees) and/or one or more organizational units and/or sub-units may be stored in a parameter structure of an IDOAM application. For example, a sampled grouping may comprise employees belonging to a particular organizational unit. Alternatively, for example, a sampled grouping may comprise one or more individual employees. Also, for example, a sampled grouping may comprise all employees of a company. In an implementation, users, such as employees, may be grouped in a number of different ways. For example, in an implementation, parameters representative of an entire employee directory for a company may be uploaded into one or more parameter structures. The employees of a company may be grouped in particular ways depending at least in part on particular subject matter of particular digital content items to be assigned, for example. In an implementation, a parameter structure may contain one or more names of one or more organizational units for particular employees and/or may contain email addresses for particular employees.

Further, with respect to operation 410, digital content representative of various training materials, policies, instructions, etc., may be uploaded to one or more parameter structures, for example. In an implementation, particular items of digital content may be assigned to particular sampled groupings. Further, one or more historical performance parameters indicative of metrics for individual employees and/or for particular organizational units and/or sub-units may be uploaded to one or more parameter structures. In general, operation 410 involves an initial set up of an IDOAM application with digital content, parameters indicative of metrics, etc. needed for subsequent operation. In an implementation, if insufficient content, parameters indicative of metrics, etc. have been provided by an administrator and/or manager, for example, an IDOAM application may signal to the administrator and/or manager that subsequent operation of the IDOAM application requires additional setup. If an IDOAM application has been sufficiently setup, such as via uploading of appropriate digital content, user parameters, etc., subsequent launch of the IDOAM application may result in normal operation without prompts for additional setup.

As indicated at operation 412, signal sample values applicable to sampled grouping may be generated to facilitate pattern matching for performance metric correlation based, at least in part, on determined thresholds, in an implementation. In general, operation 412 involves a manager, for example, selecting particular digital content from which one or more queries may be developed for one or more comprehension verification assignments, for example, for the purposes of testing an employee's understanding, retention and/or implementation of particular policies, procedures and/or instructions meant to be addressed by the selected digital content. In an implementation, a manager may also select particular users and/or particular organizational units and/or sub-units to receive the digital content and/or comprehension verification assignment. A manager may further select a time and/or date by which employees are to have submitted answers to comprehension verification assignment queries.

As was mentioned, queries may be formatted in various ways, including scales, multiple choice, yes/no, freeform, etc. In an implementation, a manager may provide, via an electronic process, an indication of expected digital assessment values, such as indicated at example operation 207 discussed above, for example. For a particular example, digital content to be disseminated may include an electronic document including a code of conduct for a particular company. In an implementation, the electronic document may contain a code of conduct that may be partitioned into numbered sections, in which case an IDOAM application may obtain input from a manager indicative of selected sections of the code of conduct that to be part of a particular comprehension verification assignment. A manager may also select a freeform answer format, for example. In an implementation, an IDOAM application may automatically record a section of text as being as related to a particular expected assessment value. For example, a first query relating to a particular code of conduct for the present example may include "What is the first rule of the Code of Conduct?" For the present example, a manager may indicate, via an electronic process, an expected assessment value indicative of an answer "A employee is expected to be courteous and respectful toward customers at all times", for example. In an implementation, an IDOAM application may record parameters representative of an entire query and/or an entire answer and/or may also record parameters representative of particular key words, such as, for example "customer, courteous and respectful". In an implementation, an artificial intelligence operation, for example, may be utilized, in whole or in part, to select keywords from particular queries and/or answers (e.g., digital assessment values), for example, although claimed subject matter is not limited in scope in these respects. If no keywords are automatically generated via artificial intelligence operations, for example, a manager may identify the keywords via an electronic process. In an implementation, a freeform answer to a query may be analyzed via an electronic process to determine the presence or absence of particular keywords, for example.

As indicated at operation 414, generated signal sample values may be applied to determined thresholds in order to determine pattern matching, for example. At this point, for operation 414, for example, a particular employee, for example, may have accessed digital content and/or comprehension verification assignment queries that may have been pushed to the employee's computing device, such as computing device 130. For example, an employee may have provided answers via an IDOAM application executed at computing device 130, for example. Continuing the example above, a particular employee may have provided a particular freeform answer to query, "What is the first rule of the Code of Conduct?" For a particular example, it may be assumed that the employee answered "To be nice to customers." In an implementation, an IDOAM application may analyze the provided answer, such as via artificial intelligence techniques, for example, and may determine that a keyword "nice" is not a synonym for "courteous" or "respectful," for example. In such a situation, for example, an employee may not be awarded, via an electronic process, any points for the usage of the word "nice." Continuing with the present example, the particular employee did include the word "customers" and this would be identified, via an electronic process, as a valid keyword by an IDOAM application. Thus, for example, an IDOAM application may award some indication of partial correctness for the particular answer. For example, given that the provided answer was only 33% correct (one of three keywords used), parameters representative of the 33% correct value would be recorded by the IDOAM application. Also, for example, the employee would be shown the relevant section(s) of digital content again and would be provide one or more additional opportunities to answer queries related to the digital content.

In an implementation, if an employee, for example, achieves a measure of correctness for a particular answer that at least meets a specified threshold, an indication of a correct assessment value may be recorded. In an implementation, measures of correctness may be stored for each round of queries provided and/or answered. In a situation involving a simpler answer format, such as yes/no or multiple choice, again, if an employee choses a wrong answer, the employee may be shown a correct answer. In such a case, an IDOAM application may simply move on and the employee may not immediately be given a chance to provide a new answer. An indication of an incorrect answer (e.g., incorrect assessment value) may be recorded, for example. Future comprehension verification assignments may ask the same and/or similar queries, and if an employee's answer changes from incorrect to correct, an indication of a correctly provided assessment value may be recorded along with one or more parameter values indicative of an increase in knowledge over prior attempts to answer the queries. Parameter values indicative, for example, of degrees of correctness, numbers of attempts, skipped queries, etc., may be stored in one or more parameter structures pertaining to an IDOAM application for later use.

As indicated, in situations in which an employee is skipping many queries and/or failing to even open a comprehension verification assignment within an established timeframe, such actions may be recorded as events of non-compliance for later human resource department action, for example, that may be taken against the employee. As was also mentioned, a user, such as an employee, may be asked to provide feedback with respect to a comprehension verification assignment. In an implementation, an employee may provide, via an electronic process, an indication of satisfaction or dissatisfaction, may provide a 1-5 star rating, may write feedback, and/or a combination of the above, for example, via an IDOAM application.

As indicated at operation 416, one or more previously determined parameters indicative of performance metrics for determining performance metric correlation may be accessed, in an implementation. At this point, continuing with the previous example, an IDOAM application may display to a manager, for example, such as in graphical, table-based and/or other format types, a filtered view of the content and/or parameters described above for the purpose of manager evaluation. For example, various parameters indicative of performance metrics (e.g., measures of correctness for particular queries and/or comprehension verification assignments, parameters indicative of historical performance metrics, etc.) may provide indications to the manager with respect to whether particular sampled groupings, such as particular groups of employees, are performing better, learning more, etc. In an implementation, an IDOAM application may present parameters indicative of performance metrics in such a way that a manager may specify via input provided to the IDOAM application that parameters indicative of performance metrics may be filtered according to a particular group or groups participating in particular comprehension verification assignments and/or may be filtered according to function, location, and/or in accordance with various other criteria depending at least in part on an amount of parameters indicative of performance metrics gathered and/or stored into a parameter structure. In some cases, if insufficient performance criteria have been gathered to determine performance trends, for example, an IDOAM application may alert a manager in this respect. At least in part in response to insufficient parameters indicative of performance metrics, a manager may specify, via an electronic process, additional comprehension verification assignments to be performed and/or may upload additional parameters indicative of historical performance metrics. In an implementation, parameters indicative of performance metrics and/or performance analysis content may be displayed as graphical display content and/or in a table format, although claimed subject matter is not limited in scope in these respects.

As indicated at operation 418, one or more parameters indicative of performance metrics may be generated based, at least in part, on determined pattern matching and/or on one or more previously determined parameters indicative of performance metrics, in an implementation. At least in part in response to an IDOAM application having sufficient parameters indicative of performance metrics, such as may be performed in connection with example operation 416, an additional check for adequate information may be performed wherein particular threshold values that may specify particular amounts of parameters indicative of performance metrics may be set. In an implementation, such threshold values may also be set at example operation 410, for example. In an implementation, threshold values for amounts of parameters indicative of performance metrics to be gathered prior to performance analysis, for example, may be pre-selected and/or set as fixed values during IDOAM application development and/or deployment.

In an implementation, for a particular sampled grouping (e.g., particular grouping of employees), a particular delta may exist from expected performance ranges as compared with parameters indicative of performance metrics for other particular groupings (e.g., subsets of employees, particular employees and/or the entire company). For example, a manager may view an IDOAM application dashboard, such as example dashboard 302, to review parameters indicative of performance metrics covering an entire company and all of its locations, for example, and/or a manager may review parameters indicative of performance metrics for a particular location, or a particular employee, etc. Depending at least in part on a particular scope of review, an additional confidence score may be displayed to the manager, in an implementation. For example, a confidence score may comprise a value, such as "medium," "strong," "weak," etc., and/or may comprise a value expressed as a percentage or on a 1-10 scale, to list but a few non-limiting examples.

In an implementation, based at least in part on an aggregate of collected and/or generated parameters indicative of performance metrics, an indication of performance for particular employees may be determined based at least in part on two or three comprehension verification assignments for a particular employee. An IDOAM application may also provide an indication that the particular employee is learning more company procedures, for example, and/or that the learning is positively affecting the employee's ability to perform their duties, for example. Also, in an implementation, an employee's feedback sentiments (e.g., that the employee feels he/she is performing better or worse) may tend to increase or decrease a confidence score, and of course any negatives in these areas would decrease it. In situations in which parameters indicative of performance metrics demonstrate that comprehension verification assignments applied to employees to date may not have had an identifiable effect on employee satisfaction and/or performance, and/or if additional parameters indicative of performance metrics are not available, a manager may be informed via an electronic process so that additional comprehension verification assignments may be administered at least for particular disseminated digital content.

As indicated at operation 420, a performance metric correlation operation may be performed via an electronic process based, at least in part, on one or more parameters indicative of performance metrics and/or on one or more sampled groupings, for example. In an implementation, parameters indicative of performance metrics generated at example operation 418 and/or other supporting content may be sufficient to allow analysis projecting into the future to give a manager, for example, an indication of potential future performance, an estimated valuation of the company, a risk assessment, and/or other parameters related to the future of a particular company. For example, a statistical trend may be sufficiently accurately projected after sufficient time has passed and/or after sufficient parameters indicative of performance metrics have been gathered. Various collections of digital content, such as parameter values, graphs and/or predictions may be inputted and/or uploaded by a manager, for example, via dashboard 302, for example.

FIG. 5 is a flow diagram depicting an embodiment 500 of an example process for generating parameter structures comprising signal values representative of sampled groupings for performance metric correlation. It should be noted that content acquired or produced, such as, for example, input signals, output signals, operations, results, etc. associated with example process 500 may be represented via one or more digital signals. It should also be appreciated that even though one or more operations are illustrated or described concurrently or with respect to a certain sequence, other sequences or concurrent operations may be employed. In addition, although the description below references one or more particular aspects and/or features illustrated in certain other figures, one or more operations may be performed with other aspects and/or features. In general, example process 500 may correspond in at least some respects to example operation 410, discussed above.

As indicated at block 501, known parameters indicative of performance metrics for a particular sampled grouping, such a particular grouping of employees, for example, may be determined, in an implementation. For example, a manager and/or administrator for a particular organization, such as a company to have purchased and/or installed an IDOAM application, may input and/or upload historical performance metric parameters pertaining to one or more particular sampled groupings. Further, as indicated at block 502, signal sample values may be determined, via an electronic process, for one or more particular sampled groupings, for example. In an implementation, a manager and/or administrator may input and/or upload digital content such as electronic documents, videos, etc. Additionally, as indicated at block 504, for uploaded digital content, a particular signal type may be determined, in an implementation. For example, a multipurpose internet mail extension (MIME) type for uploaded digital content may be determined, although claimed subject matter is not limited in scope in these respects.

In an implementation, as indicated at blocks 506 and/or 508, at least in part in responses to a MIME type for uploaded digital content being unrecognized, signals and/or states representative of an appropriate error message may be retrieved, via an electronic process, from a memory of a computing device, such as memory device 110, and/or may be displayed to a manager and/or administrator. Further, example process 500 may terminate at block 530 at least in part in response to a determination of an unrecognized signal type.

As indicated at blocks 510 and/or 512, in an implementation, at least in part in response to a determination that uploaded digital content comprises a MIME type indicating an image, optical character recognition (OCR) and/or any other suitable approach may be utilized, in whole or in part, to scan the image for textual content. Further, as depicted at blocks 518 and/or 520, at least in part in response to a determination that uploaded digital content comprises a MIME type indicating audiovisual content, speech-to-text libraries may be utilized, in whole or in part, for example, to scan the audiovisual content for textual content.

Additionally, as indicated at block 514, textual content scanned at operations 512 and/or 520 may be searched and/or tagged via an electronic process for keywords such as, by way of non-limiting example, "guideline," "policy," "rule," etc. Parameters indicative of particular keywords may be stored in a text buffer, for example. Further, sections of digital content may be tagged as priority sections for subsequent processing (e.g., see example operation 516) based at least in part on the determination of particular keywords in the particular sections. Particular sections of digital content tagged as priority sections may be displayed to a manager, for example, to allow the manager to provide, via an electronic process, input indicative of particular sections selected for subsequent pattern matching operations, discussed more fully below. At block 516, for example, a manager may electronically tag, via an IDOAM application, one or more sections from which the manager would like to generate comprehension verification assignment queries. Further, as indicated at block 540, digital content, keywords and/or indications of selected sections may be output for use by subsequent operations, such as example process 600, for example.

FIG. 6 is a flow diagram depicting an embodiment 600 of an example process for generating signal sample values applicable to sampled groupings to facilitate pattern matching for performance metric correlation. It should be noted that content acquired or produced, such as, for example, input signals, output signals, operations, results, etc. associated with example process 600 may be represented via one or more digital signals. It should also be appreciated that even though one or more operations are illustrated or described concurrently or with respect to a certain sequence, other sequences or concurrent operations may be employed. In addition, although the description below references one or more particular aspects and/or features illustrated in certain other figures, one or more operations may be performed with other aspects and/or features. In general, example process 600 may correspond in at least some respects to example operation 412, discussed above.

In an implementation, as discussed above in connection with example operation 540, digital content, keywords and/or indications of selected sections may be output by example process 500 and/or may be received at example process 600, as indicated at block 601. Further, as indicated at block 602, one or more queries may be generated via an electronic process based, at least in part, on keywords previously identified for particular digital content. Particular digital content may be scanned for particular words (e.g., unique and/or difficult words) based at least in part on a word2vec-compliant and/or compatible model and/or approach, for example. In an implementation, at least in part in response to a determination that one or more particular words (e.g., particular signal values) have been located within the particular digital content, an associated particular section of digital content may be selected for further human analysis so that a manager, for example, may decide whether or not to create a comprehension verification assignment query based at in part on the difficult and/or unique words.

As further indicated at block 610, thresholds applicable to signal values applicable to a particular sampled grouping may be determined. For example, a manager may supply an IDOAM application with expected comprehension verification assignment answers for queries generated at example operation 608, for example. Further, for example, a particular time duration for receiving input from users indicating that the user has answered the comprehension verification assignment queries may be selected and/or otherwise determined. As was mentioned, a failure to response to a push notification comprising particular digital content and/or queries pertaining to the particular digital content may result in an indication, via an electronic process, of non-compliance for a particular user, for example. Additionally, as indicated at block 614, input indicative of a value for a variable maxAttempts, representative of a maximum number attempts allowed one or more particular employees for answering at least particular comprehension verification assignment query types, may be obtained, such as from a manager, via an electronic process. Block 620, for example, may indicate completion of a particular comprehension verification assignment and/or may indicate a progression to subsequent processing, such as example process 700, discussed below.

FIG. 7 is a flow diagram depicting an embodiment of an example process for pattern matching via application of generated signal sample values to specified thresholds. It should be noted that content acquired or produced, such as, for example, input signals, output signals, operations, results, etc. associated with example process 700 may be represented via one or more digital signals. It should also be appreciated that even though one or more operations are illustrated or described concurrently or with respect to a certain sequence, other sequences or concurrent operations may be employed. In addition, although the description below references one or more particular aspects and/or features illustrated in certain other figures, one or more operations may be performed with other aspects and/or features. In general, example process 700 may correspond in at least some respects to example operation 414, discussed above.

In an implementation, input indicative of particular signal values for one or more sampled groupings, such as one or more particular groupings of employees, may be obtained, as indicated at block 710. For example, at block 701, a particular comprehension verification assignment may have been started by a particular employee and the particular employee may be beginning to provide digital assessment values (e.g., values indicative of answers) for comprehension verification assignment queries. Because the particular employee may just be beginning to answer queries, a parameter value for attempts may be set to "0."

As further indicated at block 702, at least in part in response to a particular comprehension verification assignment being responded to within a specified and/or otherwise allowed deadline, for example, processing may proceed to block 704. Otherwise, processing may advance to block 718 wherein a record of non-compliance may be stored for the particular employee and/or example process 700 may terminate. However, as indicated, at least in part in response to a particular comprehension verification assignment being responded to within a specified and/or otherwise allowed deadline, processing may proceed to block 704. At block 704, for example, an original signal sample, such as may be representative of a provided assessment value for a particular query, may be compared, via an electronic process, with an input signal representative of an answer to a particular comprehension verification assignment query provided by an employee, for example. In an implementation, an answer may be provided, via an electronic process, in a freeform format, and a word2vec and/or the like approach may be utilized, in whole or in part, to analyze the provided answer. Further, one or more digital assessment values provided by an employee may be stored as a vector representation in a memory for subsequent processing.

As indicated at block 706, a determination may be made as to whether an amount of attempts to correctly answer a query (e.g., within suitable and/or specified thresholds) has met a maximum number of attempts as defined, for example, by a parameter value maxAttemps. In the event of an incorrect answer and/or if additional attempts are allowed to the particular employee for the particular comprehension verification assignment query, processing may advance to block 708. Otherwise, such as in a situation wherein an employee provides, via an electronic process, a correct assessment value or the particular employee has reached the maximum number of attempts for the particular query, the employee may continue to answer queries (not shown) or the employee may be presented a feedback form, such as via a graphical user interface, by which input indicative of group member (e.g., employee) experience may be obtained.

With respect to block 708, a determination may be made, such as via a comparison to stored records for a particular employee, whether the particular employee has failed to answer the particular query correctly at least a threshold number of times. Further, as indicated at block 710, at least in part in response to a determination that a particular employee may have entered many (e.g., exceeding a specified threshold parameter value) incorrect digital assessment values, a report may be automatically created, via an electronic process, for subsequent training and/or for further analysis, such as for human resource department investigation. However, claimed subject matter is not limited in scope in these respects.

Also, as indicated at block 712, at least in part in response to a determination that a particular employee has not entered a threshold amount of incorrect answers, a determination may be made, via an electronic process, as to whether an unacceptable delta exists between an assessment value provided by the particular employee and the expected assessment value. If the delta is too large, processing may proceed to block 714 wherein a record of a particular employee's misunderstanding may be stored for further review and/or analysis.

In an implementation, as indicated at block 816, at least in part in response to no additional queries remaining, an employee may be shown a graphical user interface screen by which the employee may enter feedback, such as in the form of star-rating, provide a written review and/or provide some kind type of indication showing overall satisfaction or dissatisfaction with a particular comprehension verification assignment, for example. At indicated at block 720, example process 700 may terminate.

Figure 8:
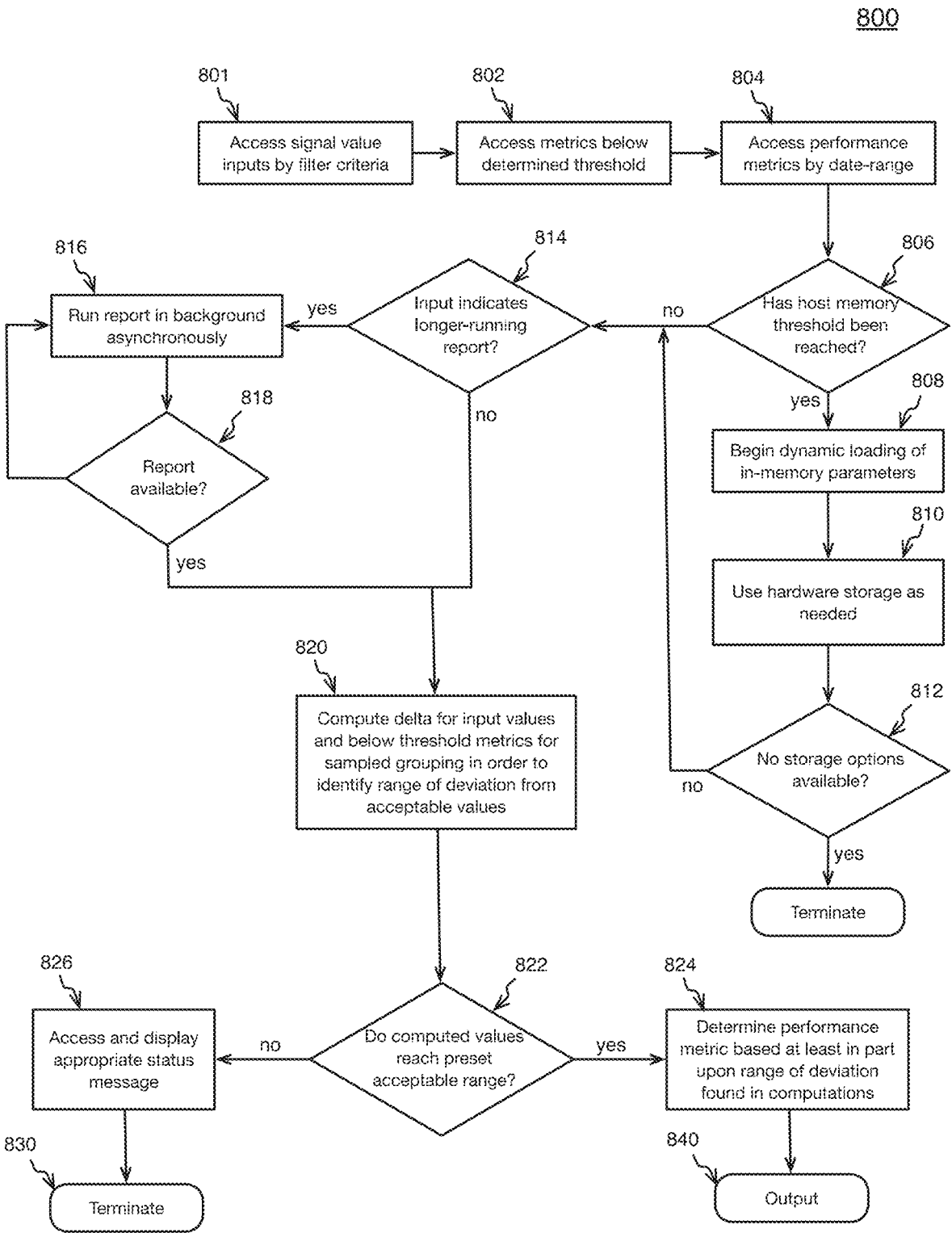
FIG. 8 is a flow diagram depicting an example process for generating performance metrics, in accordance with an embodiment.

FIG. 8 is a flow diagram depicting an embodiment 800 of an example process for generating parameters indicative of performance metrics based, at least in part, on determined pattern matching and/or one or more previously determined parameters indicative of performance metrics. It should be noted that content acquired or produced, such as, for example, input signals, output signals, operations, results, etc. associated with example process 800 may be represented via one or more digital signals. It should also be appreciated that even though one or more operations are illustrated or described concurrently or with respect to a certain sequence, other sequences or concurrent operations may be employed. In addition, although the description below references one or more particular aspects and/or features illustrated in certain other figures, one or more operations may be performed with other aspects and/or features. In general, example process 800 may correspond in at least some respects to example operation 418, discussed above.

In an implementation, as indicated at block 801, user signal values, such as parameters indicative of one or more employee characteristics and/or indicative of one or more performance metrics, may be accessed, via an electronic process, at least in part in accordance with one or more filter criteria. For example, a manager may access employee parameters and/or parameters indicative of performance metrics via dashboard 302 of an IDOAM application. In an implementation, a manager may refine and/or revise parameters indicative of performance metrics, date ranges, locations, employee functions, etc. Further, as indicated at block

802, parameters indicative of performance metrics falling below a specified and/or otherwise determined threshold may be accessed. For example, an IDOAM application may retrieve a list of reports pertaining to particular locations and/or particular employees under review, such as for non-compliance, code violations, etc. Additionally, as indicated at block 804, parameters indicative of performance metrics may be accessed, via an electronic process, at least in part according to a specified date-range. For example, reducing an amount of records to be processed by specifying a reduced date-range may reduce usage of computing resources.

As indicated at block 806, for example, a determination may be made as to whether an access of parameters indicative of performance metrics and/or other parameters has resulting in a memory usage threshold being reached. At least in part in response to a determination that such a threshold has been reached, processing may proceed to block 808, for example, wherein a dynamic loading and/or allocation of parameters in memory may begin, for example. Further, parameters not currently under review may be flushed from memory to make room for additional parameters indicative of performance metrics to be loaded, for example. Also, for example, hardware storage, such as one or more memories, hard disks, solid state drives, etc., may be utilized, in whole or in part, to store parameters indicative of performance metrics and/or other parameters, at least until such time as memory may be freed (e.g. from a manager changing a date-range and/or an amount of parameters indicative of performance metrics and/or other parameters to be reviewed). In an implementation, at least in part in response to no storage options being available, example process 800 may terminate.

Returning to block 806, at least in part in response to a determination that a memory threshold has not been reached, processing may proceed to block 814, for example. As indicated at block 814, a determination may be made via an electronic process as to whether one or more particular reports being requested, such as from a manager, is relatively large (e.g., takes up significant memory and/or processing resources). As indicated at block 816, a manager, for example, may select, via an electronic process, to run a report as a background task in an asynchronous manner. By generating a report as a background task, other functions may be performed as the report is being prepared, for example. In an implementation, a determination to prepare a report as a background task may be made explicitly, such as via selection by a manager, and/or may be made automatically.

As further indicated at block 818, at some point a requested report may become available, for example. In an implementation, as indicated at block 820, an IDOAM application may perform one or more computations to determine if an acceptable delta between input values and below-threshold parameters indicative of performance metrics (e.g., specified at block 802) for a particular sampled grouping (e.g., particular grouping of employees) exists in order to identify a range of deviation from acceptable and/or suitable values. For example, if the filter criteria, such as may be specified at block 801, for example, and/or as may be specified at blocks 802 and/or 804, results in a single sales department for a particular company being viewed, for example, and/or if the members of that department had not all studied the basic sales procedures of the company, for example, further processes (such as the generation of a confidence score for the department) would not be performed by an IDOAM application. Such an occurrence may indicate to a manager to perform more comprehension verification assignments with that particular department and/or to enter additional parameters indicative of historical performance metrics pertaining to the particular department. Further, as indicated at block 826, an appropriate status message may be accessed and/or displayed, and example process 800 may terminate.

However, if the computed delta is determined, via an electronic process, to be within an acceptable range, processing may proceed to block 824 wherein a performance metric may be determined, via an electronic process, based at least in part on a range of deviation found in the computations. For example, a computed delta determined to be in an acceptable range may indicate, at least in part, a correlation between knowledge retention and performance for the particular employee grouping.

In an implementation, responsive at least in part to sufficient parameters indicative of performance metrics being available and/or responsive at least in part to a delta value computed at example operation 820 being within range, a confidence score may be generated, via an electronic process, for the filtered scope (e.g., filtered based at least in part on location, company, department, etc.). In an implementation, a confidence score may be provided as a descriptive phrase or word, such as "Strongly confident" and/or the like and/or it may be represented by a particular icon, or represented on 1-10 scale, for example. In an implementation, a manager may be provided, via an electronic process, an indication of a measure of success and/or of predicted success across a specified grouping of users based at least in part on changes in parameters indicative of performance metrics observed and/or recorded over a period of time and/or based at least in part on determinations of correlations between parameters indicative of metrics of performance. In an implementation, processing may proceed to block 840, indicating further subsequent processing, such as via example process 900, as explained more fully below.

Figure 9:
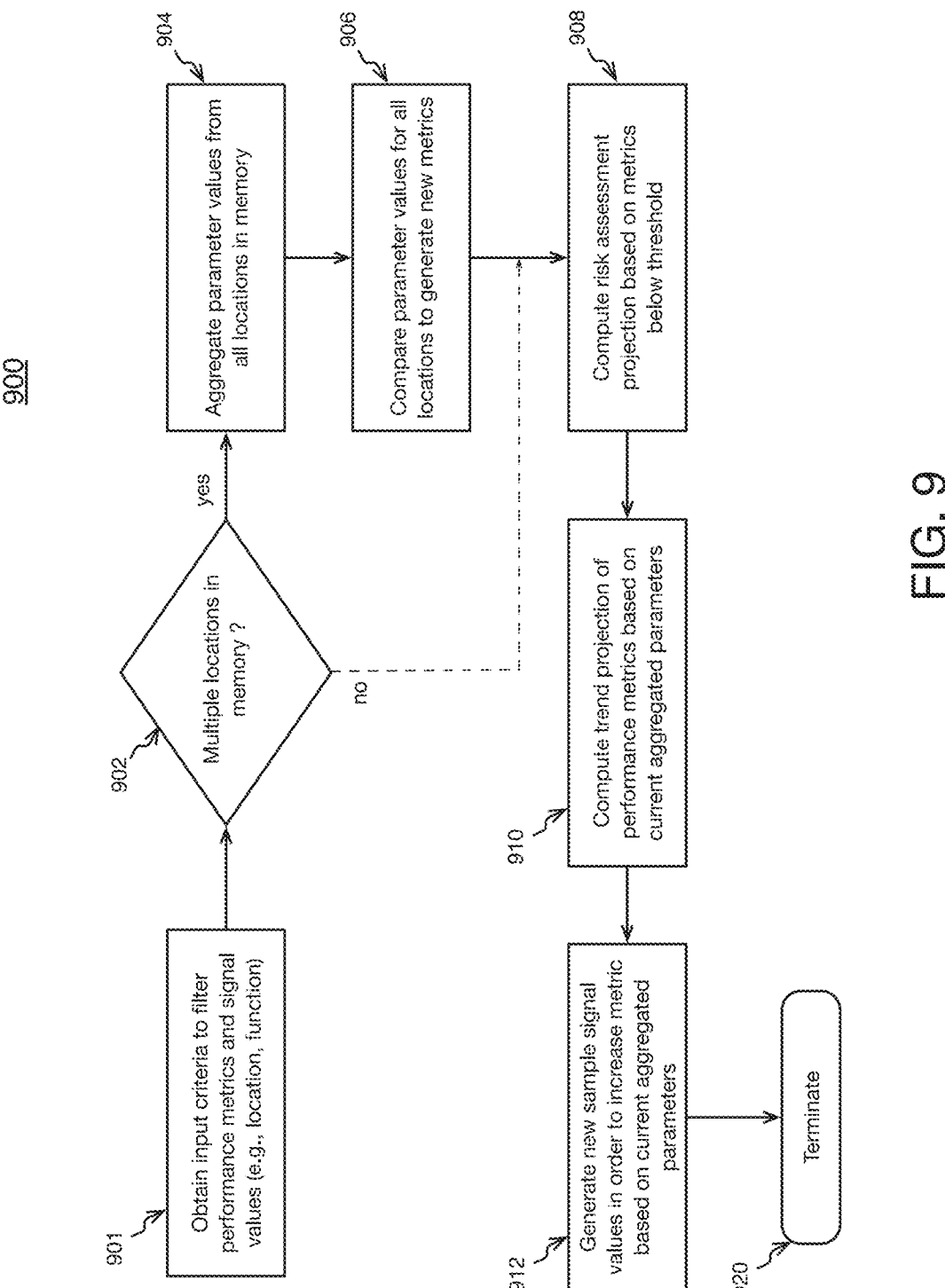
FIG. 9 is a flow diagram depicting an example process for performance metric correlation, in accordance with an embodiment.

FIG. 9 is a flow diagram depicting an embodiment 900 of an example process for performance metric correlation. It should be noted that content acquired or produced, such as, for example, input signals, output signals, operations, results, etc. associated with example process 900 may be represented via one or more digital signals. It should also be appreciated that even though one or more operations are illustrated or described concurrently or with respect to a certain sequence, other sequences or concurrent operations may be employed. In addition, although the description below references one or more particular aspects and/or features illustrated in certain other figures, one or more operations may be performed with other aspects and/or features. In general, example process 900 may correspond in at least some respects to example operation 420, discussed above.

In an implementation, input criteria may be obtained, such as from a manager and/or administrator via an IDOAM application, to filter parameters indicative of performance metrics and/or signal values, such as pertaining to location, function, etc. For example, process 900 may begin with a manager and/or administrator providing input, via an electronic process, to indicate, at least in part, which parameters indicative of performance metrics, locations and group member functions, for example, to view and/or process in subsequent operations. As indicated at block 902, an IDOAM application may determine, via an electronic process, whether specified filter criteria indicate parameters indicative of performance metrics pertaining to users, such as employees, distributed over more than one geographical location.

As indicated at block 904, for a situation in which parameters indicative of performance metrics covering multiple locations have been requested via specified filter criteria, an IDOAM application may aggregate parameters indicative of performance metrics for the various locations in a memory of a computing device, such as computing device 110. Additionally, as indicated at block 906, performance metric values for the various locations may be compared so as to generate new parameters indicative of metrics, in an implementation. For example, parameters indicative of metrics may be generated for digital content evaluated via comprehension verification assignments up to a particular point in time. Further, for example, parameters indicative of metrics may be generated, via an electronic process, indicating changes in parameters indicative of performance metrics from one location to another. For example, if employees from more than one location have been trained on similar study materials but experienced a different change in parameters indicative of performance metrics, potential causes for the different changes may be investigated. Additionally, for example, an IDOAM application may be trained (e.g., via machine learning algorithms) to detect such discrepancies and/or to try to help managers and/or administrators understand the differences.

In an implementation, depending at least in part on an amount of performance metric values available and/or depending at least in part on any parameters indicative of metrics that might indicate particular risk for particular locations and/or company wide, for example, a report showing a risk assessment may be generated, via an electronic process, using aggregated performance metric values generated at block 904. Further, as indicated at block 910, a trend projection of particular parameters indicative of performance metrics may be computed, via an electronic process, based at least in part on current aggregated performance metric values. In an implementation, a performance trend projection calculation may be optionally performed. In an implementation, a statistical trend projection may be performed on performance metric values stored in a memory, such as to show what could be expected to happen in the future with respect to parameters indicative of performance metrics. In an implementation, a "random walk with drift" calculation may be performed, via an electronic process, to predict, at least in part, a particular performance metric "Y" at a point and/or period of time "t" based, at least in part, on the particular performance metric from a previous point and/or period of time (t–1), a constant, such as a drift value "α" and/or a noise factor "$\varepsilon_t$" in accordance with example relation (1) below:

$$Y_t = \alpha + Y_{t-1} + \varepsilon_t \qquad (1)$$

Further, for example, new sample values may optionally be generated, via an electronic process, in order to increase a particular performance metric based at least in part on current aggregated performance metric values, in an implementation. For example, based at least in part on determinations that may be gleaned from parameters indicative of performance metrics and/or from performance trend analysis, one or more materials, such as particular items of digital content, may be recommended for subsequent comprehension verification assignments that may enhance available performance metric values. In an implementation, generation of additional comprehension verification assignments may be optionally performed via an electronic process. Also, for example, an IDOAM application may at least partially generate additional comprehension verification assignment queries and/or a manager may complete, via an electronic process, such additional comprehension verification assignment queries.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to cooperate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, MD, 21050-2747), but may include other aspects, such as the Hadoop distributed file system (HDFS) (available from the Apache Software Foundation, 1901 Munsey Drive, Forrest Hill, MD, 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet.

Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized, in whole or in part, to specify digital content and/or to specify a format thereof, such as in the form of an electronic file and/or an electronic document, such as a Web page, Web site, etc., for example. An Extensible Markup Language ("XML") may also be utilized, in whole or in part, to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, OsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 10:
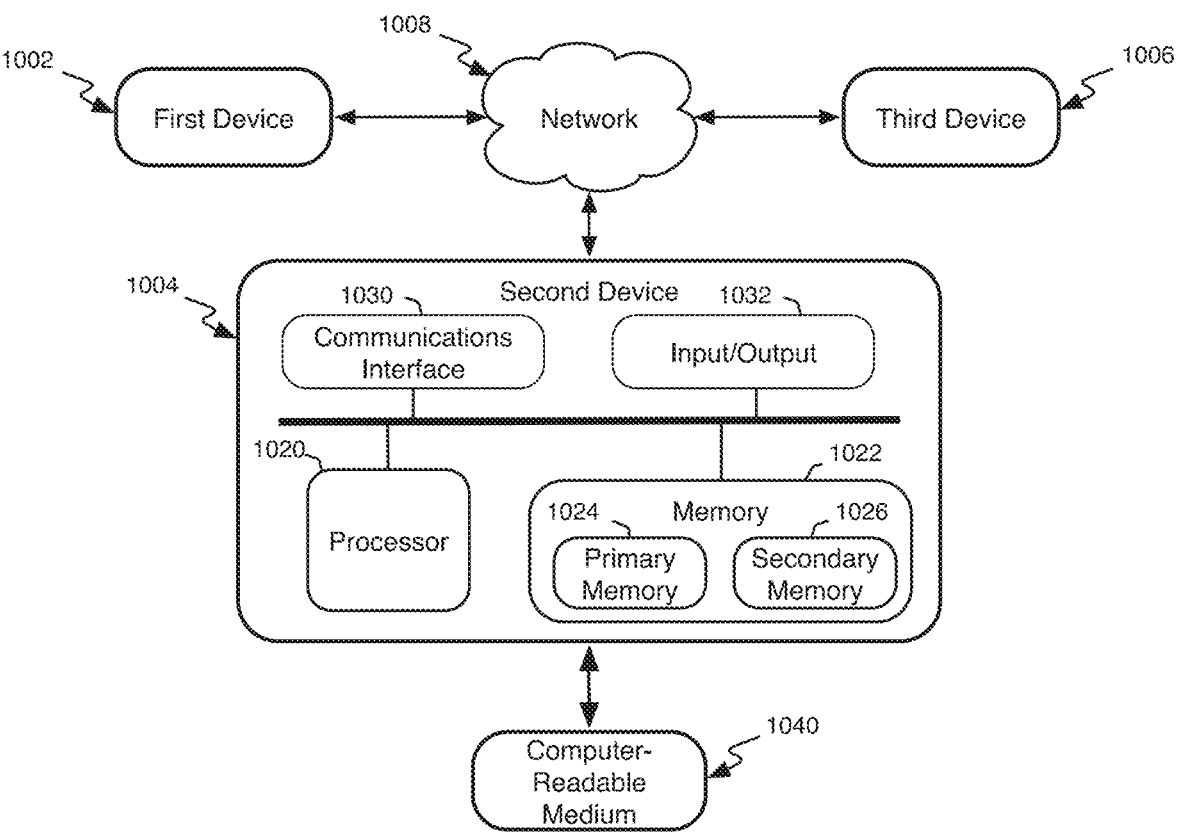
FIG. 10 is a schematic block diagram illustrating an example computing environment, in accordance with an embodiment.

In one example embodiment, as shown in FIG. 10, a system embodiment may comprise a local network (e.g., device 1004 and medium 1040) and/or another type of network, such as a computing and/or communications network. For purposes of illustration, therefore, FIG. 10 shows an embodiment 1000 of a system that may be employed to implement either type or both types of networks. Network 1008 may comprise one or more network connections, links, processes, services, applications, and/or resources to facilitate and/or support communications, such as an exchange of communication signals, for example, between a computing device, such as 1002, and another computing device, such as 1006, which may, for example, comprise one or more client computing devices and/or one or more server computing device. By way of example, but not limitation, network 1008 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 10 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112(f) so that it is specifically intended that 35 USC § 112(f) not be implicated by use of the term "computing device" and/or similar terms, however, if it is determined, for some reason not immediately apparent, that the foregoing understanding cannot stand and that 35 USC § 112(f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1-9, and in the text associated with the foregoing figure(s) of the present patent application.

Referring now to FIG. 10, in an embodiment, first and third devices 1002 and 1006 may be capable of rendering a graphical user interface (GUI) for a network device and/or a computing device, for example, so that a user-operator may engage in system use. Device 1004 may potentially serve a similar function in this illustration. Likewise, in FIG. 10, computing device 1002 ('first device' in figure) may interface with computing device 1004 ('second device' in figure), which may, for example, also comprise features of a client computing device and/or a server computing device, in an embodiment. Processor (e.g., processing device) 1020 and memory 1022, which may comprise primary memory 1024 and secondary memory 1026, may communicate by way of a communication bus 1015, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 1004, as depicted in FIG. 10, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 10, computing device 1002 may provide one or more sources of executable computer instructions in the form physical states and/or signals (e.g., stored in memory states), for example. Computing device 1002 may communicate with computing device 1004 by way of a network connection, such as via network 1008, for example. As previously mentioned, a connection, while physical, may not necessarily be tangible. Although computing device 1004 of FIG. 10 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1022 may comprise any non-transitory storage mechanism. Memory 1022 may comprise, for example, primary memory 1024 and secondary memory 1026, additional memory circuits, mechanisms, or combinations thereof may be used. Memory 1022 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1022 may be utilized, in whole or in part, to store a program of executable computer instructions. For example, processor 1020 may fetch executable instructions from memory and proceed to execute the fetched instructions. Memory 1022 may also comprise a memory controller for accessing device readable-medium 1040 that may carry and/or make accessible digital content, which may include code, and/or instructions, for example, executable by processor 1020 and/or some other device, such as a controller, as one example, capable of executing computer instructions, for example. Under direction of processor 1020, a non-transitory memory, such as memory cells storing physical states (e.g., memory states), comprising, for example, a program of executable computer instructions, may be executed by processor 1020 and able to generate signals to be communicated via a network, for example, as previously described. Generated signals may also be stored in memory, also previously suggested.

Memory 1022 may store electronic files and/or electronic documents, such as relating to one or more users, and may also comprise a computer-readable medium that may carry and/or make accessible content, including code and/or instructions, for example, executable by processor 1020 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 10, processor 1020 may comprise one or more circuits, such as digital circuits, to perform at least a portion of a computing procedure and/or process. By way of example, but not limitation, processor 1020 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1020 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 10 also illustrates device 1004 as including a component 1032 operable with input/output devices, for example, so that signals and/or states may be appropriately communicated between devices, such as device 1004 and an input device and/or device 1004 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising:

obtaining, at a first computing device from a second computing device, one or more signals and/or signal packets representative of digital content representative of one or more particular instructions, directives, procedures and/or policies for a population of users;

at the first computing device, autonomously converting the one or more signals and/or signal packets representative of the digital content from a first format to a second format;

disseminating a subset of the digital content to at least one or more user computing devices associated with a respective one or more users of the population of users, wherein the subset of the digital content is representative of a subset of the one or more particular instructions, directives, procedures and/or policies;

obtaining, from the second computing device, one or more signals and/or signal packets representative of one or more freeform responses to a respective one or more prompts provided to the second computing device by the first computing device, wherein the one or more prompts are autonomously generated by the first computing device based at least in part on the subset of the digital content; and autonomously generating, at least in part via one or more artificial intelligence (AI) operations based at least in part on the one or more freeform responses, a plurality of comprehension and/or retention verification questions related to the digital content intended to test the one or more users of the population of users for comprehension and/or retention of the one or more particular instructions, directives, procedures and/or policies of the subset of digital content.

2. The method of claim 1, further comprising:

obtaining, from the second computing device, a first input specifying a subset of the plurality of comprehension and/or retention verification questions; and obtaining, from the second computing device, one or more signals and/or signal packets representative of one or more example freeform answers to the specified subset of the plurality of comprehension verification questions.

3. The method of claim 2, further comprising pushing the specified subset of the plurality of comprehension verification questions to the one or more user computing devices associated with the respective one or more users of the population of users.

4. The method of claim 3, further comprising:

obtaining, at the first computing device from at least one of the one or more user computing devices, one or more freeform answers to the specified subset of the plurality of comprehension verification questions; and performing one or more AI-based pattern-matching operations based at least in part on the one or more example freeform answers to the specified subset of the plurality of comprehension verification questions obtained from the first computing device and based at least in part on the one or more freeform answers obtained from the one or more user computing devices.

5. The method of claim 4, further comprising:

generating confidence scores, based at least in part on a determination as to whether the one or more AI-based pattern matching operations meets or exceeds a specified threshold, for individual users associated with the one or more user computing devices, wherein the confidence score indicates a measure of comprehension and/or retention of the subset of the one or more particular instructions, directives, procedures and/or policies.

6. The method of claim 1, wherein the converting the one or more signals and/or signal packets representative of the digital content from the first format to the second format comprises partitioning the digital content in the second format into a plurality of identifiable sections, and wherein the disseminated subset of the digital content comprises one or more of the identifiable sections.

7. The method of claim 6, further comprising:

obtaining, at the first computing device from the second computing device, a second input specifying the one or more identifiable sections for dissemination; and obtaining, at the first computing device from the second computing device, a third input specifying the one or more population of users.

8. The method of claim 6, wherein the plurality of identifiable sections of the digital content are maintained as a list in a parameter structure of a memory of the first computing device, and wherein the method further comprises allocating a new record within the parameter structure responsive at least in part to a revision of one or more of the plurality of identifiable sections.

9. The method of claim 1, wherein the converting the one or more signals and/or signal packets representative of the digital content from the first format to the second format comprises analyzing the digital content to identify a signal type, and wherein the method further comprises:

responsive, at least in part, to an identification of the signal type as an image, performing an image-to-text operation to scan for textual content; and/or responsive, at least in part, to an identification of the signal type as audio, performing an audio-to-text operation to scan for textual content.

10. The method of claim 1, further comprising autonomously generating, at the first computing device, the one or more prompts at least in part by performing an AI-based analysis of the subset of the digital content, in the second format, to identify one or more keywords.

11. An apparatus, comprising: a processor of a first computing device to:

obtain, from a second computing device, one or more signals and/or signal packets representative of digital content representative of one or more particular instructions, directives, procedures and/or policies for a population of users;

autonomously convert the one or more signals and/or signal packets representative of the digital content from a first format to a second format;

initiate dissemination, at least in part via a communication network, of a subset of the digital content to at least one or more user computing devices associated with a respective one or more users of the population of users, wherein the subset of the digital content is representative of a subset of the one or more particular instructions, directives, procedures and/or policies;

obtain, from the second computing device, one or more signals and/or signal packets representative of one or more freeform responses to a respective one or more prompts provided to the second computing device by the first computing device, wherein the one or more prompts are autonomously generated at least in part by the processor of the first computing device based at least in part on the subset of the digital content; and autonomously generate, at least in part via one or more artificial intelligence (AI) operations based at least in part on the one or more freeform responses, a plurality of comprehension and/or retention verification questions related to the digital content intended to test the one or more users of the population of users for comprehension and/or retention of the one or more particular instructions, directives, procedures and/or policies of the subset of digital content.

12. The apparatus of claim 11, wherein the processor of the first computing device is further to:

obtain, from the second computing device, a first input specifying a subset of the plurality of comprehension and/or retention verification questions; and obtain, from the second computing device, one or more signals and/or signal packets representative of one or more example freeform answers to the specified subset of the plurality of comprehension verification questions.

13. The apparatus of claim 12, wherein the processor of the first computing device is further to push, at least in part via the communication network, the specified subset of the plurality of comprehension verification questions to the one or more user computing devices associated with the respective one or more users of the population of users.

14. The apparatus of claim 13, wherein the processor of the first computing device is further to:

obtain, at the first computing device from at least one of the one or more user computing devices, one or more freeform answers to the specified subset of the plurality of comprehension verification questions;

perform one or more AI-based pattern-matching operations based at least in part on the one or more example freeform answers to the specified subset of the plurality of comprehension verification questions obtained from the first computing device and based at least in part on the one or more freeform answers obtained from the one or more user computing devices; and generate confidence scores, based at least in part on a determination as to whether the one or more AI-based pattern matching operations meets or exceeds a specified threshold, for individual users associated with the one or more user computing devices, wherein the confidence score indicates a measure of comprehension and/or retention of the subset of the one or more particular instructions, directives, procedures and/or policies.

15. The apparatus of claim 11, wherein, to convert the one or more signals and/or signal packets representative of the digital content from the first format to the second format, the processor of the first computing device to partition the digital content in the second format into a plurality of identifiable sections, and wherein the disseminated subset of the digital content comprises one or more of the identifiable sections.

16. The apparatus of claim 15, wherein the processor of the first computing device is further to:

obtain, from the second computing device, a second input specifying the one or more identifiable sections for dissemination; and obtain, from the second computing device, a third input specifying the one or more users of the population of users.

17. The apparatus of claim 15, wherein the plurality of identifiable sections of the digital content are maintained as a list in a parameter structure of a memory of the first computing device, and wherein the processor of the first computing device is further to allocate a new record within the parameter structure responsive at least in part to a revision of one or more of the plurality of identifiable sections.

18. The apparatus of claim 11, wherein, to convert the one or more signals and/or signal packets representative of the digital content from the first format to the second format, the processor of the first computing device is further to:

analyze the digital content to identify a signal type:

responsive, at least in part, to an identification of the signal type as an image, perform an image-to-text operation to scan for textual content; and/or responsive, at least in part, to an identification of the signal type as audio, perform an audio-to-text operation to scan for textual content.

19. The apparatus of claim 11, wherein the processor of the first computing device is further to autonomously generate the one or more prompts at least in part by performing an AI-based analysis of the subset of the digital content, in the second format, to identify one or more keywords.

20. An article, comprising: a computer readable medium having stored thereon instructions executable by a computing device to:

obtain, from a second computing device, one or more signals and/or signal packets representative of digital content representative of one or more particular instructions, directives, procedures and/or policies for a population of users;

autonomously convert the one or more signals and/or signal packets representative of the digital content from a first format to a second format;

initiate dissemination, at least in part via a communication network, of a subset of the digital content to at least one or more user computing devices associated with a respective one or more users of the population of users, wherein the subset of the digital content is representative of a subset of the one or more particular instructions, directives, procedures and/or policies;

obtain, from the second computing device, one or more signals and/or signal packets representative of one or more freeform responses to a respective one or more prompts provided to the second computing device by the first computing device, wherein the one or more prompts are autonomously generated at least in part by the processor of the first computing device based at least in part on the subset of the digital content; and autonomously generate, at least in part via one or more artificial intelligence (AI) operations based at least in part on the one or more freeform responses, a plurality of comprehension and/or retention verification questions related to the digital content intended to test the one or more users of the population of users for comprehension and/or retention of the one or more particular instructions, directives, procedures and/or policies of the subset of digital content.

\*  \*  \*  \*  \*